(12) United States Patent
Yamasaki et al.

(10) Patent No.: US 10,311,389 B2
(45) Date of Patent: Jun. 4, 2019

(54) MANAGEMENT COMPUTER, MANAGEMENT METHOD, AND COMPUTER-READABLE NON-TRANSITORY STORAGE MEDIUM

(71) Applicant: HITACHI, LTD., Tokyo (JP)

(72) Inventors: Kenta Yamasaki, Tokyo (JP); Youko Shiga, Tokyo (JP); Takashi Tameshige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 953 days.

(21) Appl. No.: 14/770,274

(22) PCT Filed: Oct. 28, 2013

(86) PCT No.: PCT/JP2013/079096
§ 371 (c)(1),
(2) Date: Aug. 25, 2015

(87) PCT Pub. No.: WO2015/063826
PCT Pub. Date: May 7, 2015

(65) Prior Publication Data
US 2016/0189070 A1 Jun. 30, 2016

(51) Int. Cl.
G06Q 10/06 (2012.01)
G06F 9/455 (2018.01)

(52) U.S. Cl.
CPC ... *G06Q 10/06312* (2013.01); *G06F 9/45558* (2013.01); *G06Q 10/06* (2013.01); *G06F 2009/4557* (2013.01)

(58) Field of Classification Search
None
See application file for complete search history.

(56) References Cited

U.S. PATENT DOCUMENTS

| 2001/0025247 | A1* | 9/2001 | Nagai | G06Q 10/06 |
| | | | | 705/7.14 |
| 2008/0154837 | A1* | 6/2008 | Morimura | G06F 11/3419 |
| | | | | 706/48 |

(Continued)

FOREIGN PATENT DOCUMENTS

| JP | 11-110204 A | 4/1999 |
| JP | 2008-158628 A | 7/2008 |

(Continued)

OTHER PUBLICATIONS

Written Opinion with International Search Report, PCT/JP2013/079096, dated Dec. 10, 2013, 11 pages (7 pages in Japanese Language, 4 pages in English Language).

*Primary Examiner* — Lewis A Bullock, Jr.
*Assistant Examiner* — Melissa A Headly
(74) *Attorney, Agent, or Firm* — Volpe and Koenig, P.C.

(57) ABSTRACT

A management computer for managing a management target system comprises an operation situation evaluating part, an operation situation displaying part, an amelioration plan generating part, and an amelioration plan displaying part. The amelioration plan generating part identifies, as an amelioration plan, a business system configuration that ameliorates the operation situation of the business system that is in operation, based on operation situation value calculated by the operation situation evaluating part. The amelioration plan displaying part displays an operation situation that is expected in a case where a business system configuration identified by the amelioration plan generating part is applied, in association with the operation situation of the business system that is in operation.

6 Claims, 24 Drawing Sheets

(56) References Cited

U.S. PATENT DOCUMENTS

2009/0235267 A1* 9/2009 McKinney ............ G06F 11/328
                                                        718/104
2011/0055139 A1   3/2011 Morimura et al.
2011/0208682 A1   8/2011 Morimura et al.
2012/0317069 A1  12/2012 Oono

FOREIGN PATENT DOCUMENTS

| JP | 2009-223886 A   | 10/2009 |
| WO | 2011/105001 A1  |  9/2011 |
| WO | 2013/157072 A1  | 10/2013 |

* cited by examiner

Fig. 5

| RESOURCE TYPE | UNIT PRICE | CHARGING METHOD |
|---|---|---|
| CPU | ¥10/GHz | METERED CHARGING (TIME) |
| MEMORY | ¥10/GB | METERED CHARGING (TIME) |
| SSD | ¥50/GB | FIXED CHARGING |
| ... | ... | ... |

| SYSTEM TEMPLATE ID | SYSTEM TEMPLATE TYPE | LEVEL | VIRTUAL MACHINE A | VIRTUAL MACHINE B | VIRTUAL MACHINE C | VIRTUAL MACHINE D | .. |
|---|---|---|---|---|---|---|---|
| 1 | WEB SYSTEM | 1 | Web SERVER1 | Web SERVER1 | App SERVER1 | DB SERVER1 | .. |
| 2 | WEB SYSTEM | 2 | Web SERVER2 | App SERVER2 | DB SERVER1 | - | .. |
| 3 | WEB SYSTEM | 3 | Web SERVER2 | App SERVER2 | DB SERVER2 | - | .. |
| 4 | WEB SYSTEM | 4 | Web SERVER3 | App SERVER2 | DB SERVER2 | - | .. |
| ... | ... | ... | ... | ... | ... | ... | .. |
| 8 | DEVELOPMENT SYSTEM | 1 | DEVELOPMENT SERVER1 | - | - | - | .. |
| ... | ... | ... | ... | ... | ... | ... | .. |

| VIRTUAL MACHINE TEMPLATE ID | CPU[GHz] | MEMORY[GB] | DISK CAPACITY[GB] | DISK TYPE |
|---|---|---|---|---|
| Web SERVER1 | 5 | 4 | 40 | SSD |
| Web SERVER2 | 3 | 2 | 20 | SATA |
| Web SERVER3 | 1 | 2 | 20 | SATA |
| ... | ... | ... | ... | ... |

Fig. 8

| SYSTEM TEMPLATE TYPE | CHARACTERISTICS INFORMATION |
|---|---|
| WEB SYSTEM | DB SERVER RESOURCE IS GIVEN PRIORITY |
| DEVELOPMENT SYSTEM | CPU RESOURCE AND MEMORY RESOURCE ARE GIVEN PRIORITY |
| ... | ... |

Fig. 9

| ITEM | FULL CAPACITY | ALLOCATED CAPACITY |
|---|---|---|
| CPU | 200GHz | 120GHz |
| MEMORY | 640GB | 400GB |
| SSD | 20TB | 5TB |
| SATA | 20TB | 8TB |
| RUNNING COST | 20000 | 10000 |

| BUSINESS SYSTEM ID | SYSTEM TEMPLATE ID |
|---|---|
| BUSINESS SYSTEM A | 3 |
| BUSINESS SYSTEM B | 2 |
| ... | ... |

BUSINESS SYSTEM A

| VIRTUAL MACHINE TEMPLATE ID | VIRTUAL MACHINE NAME | CPU UTILIZATION RATIO[%] | MEMORY UTILIZATION RATIO[%] | DISK UTILIZATION RATIO[IOPS] | RUNNING TIME |
|---|---|---|---|---|---|
| Web SERVER2 | Web-VM | 10 | 70 | 45 | 350 |
| App SERVER2 | App-VM | 35 | 70 | 48 | 350 |
| DB SERVER2 | DB-VM | 50 | 80 | 52 | 350 |

| | | | 2013/07/12 10:00:00 | | | | 115 |
|---|---|---|---|---|---|---|---|
| BUSINESS ID (1201) | BUSINESS ADEQUACY RATIO (1202) | CPU ADEQUACY DEVIATION DEGREE (1203) | MEMORY ADEQUACY DEVIATION DEGREE (1204) | DISK ADEQUACY DEVIATION DEGREE (1205) | CHARGED AMOUNT (1206) | RUNNING COST (1207) | |
| BUSINESS SYSTEM A | 20 | -80 | 17 | -10 | 12000 | 200 | |
| BUSINESS SYSTEM B | 60 | 40 | 5 | 15 | 15000 | 550 | |
| ... | ... | ... | ... | ... | ... | ... | |

Fig. 13

| | | | | BUSINESS SYSTEM A | | | | 119 |
|---|---|---|---|---|---|---|---|---|
| AMELIORATION PLAN ID (1301) | AMELIORATION PLAN (1302) | EXPECTED BUSINESS ADEQUACY RATIO (1303) | EXPECTED CPU ADEQUACY DEVIATION DEGREE (1304) | EXPECTED MEMORY ADEQUACY DEVIATION DEGREE (1305) | EXPECTED DISK ADEQUACY DEVIATION DEGREE (1306) | EXPECTED CHARGED AMOUNT (1307) | EXPECTED RUNNING COST (1308) | AFFECTED BUSINESS ID (1309) |
| 1 | CHANGE WEB SYSTEM TO LEVEL 4 | 60 | -40 | 17 | -10 | 13000 | 300 | BUSINESS SYSTEM B |
| 2 | CHANGE WEB SYSTEM TO LEVEL 5 | 50 | -50 | 33 | -10 | 12000 | 250 | BUSINESS SYSTEM B BUSINESS SYSTEM C |
| ... | ... | ... | ... | ... | ... | ... | ... | |

| BUSINESS SYSTEM ID | DRAWING RULE |
|---|---|
| BUSINESS SYSTEM A | Blue |
| BUSINESS SYSTEM B | #112233 |
| ... | ... |

Fig. 32

| SYSTEM CONFIGU-RATION | MAXIMUM THROUGHPUT (pv/sec) | RESPONSE TIME (msec) | CPU UTILIZATION RATIO | MEMORY UTILIZATION RATIO | DISK I/O UTILIZATION RATIO | NETWORK I/O UTILIZATION RATIO |
|---|---|---|---|---|---|---|
| SYSTEM CONFIGU-RATION A | 101 | 1250 | 67% | 58% | 45% | 54% |
| SYSTEM CONFIGU-RATION B | 254 | 1350 | 59% | 58% | 49% | 34% |
| SYSTEM CONFIGU-RATION C | 409 | 2450 | 52% | 58% | 55% | 23% |
| ... | ... | ... | ... | ... | ... | ... |

MANAGEMENT COMPUTER, MANAGEMENT METHOD, AND COMPUTER-READABLE NON-TRANSITORY STORAGE MEDIUM

BACKGROUND OF THE INVENTION

This invention relates to a management computer for managing a management target system.

There is a technology that visualizes in the form of a graph or the like a situation in which an information system operates, to thereby facilitate the keeping track of the operation situation. An example of this technology is found in Japanese Patent Application Laid-open No. 2009-223886. Japanese Patent Application Laid-open No. 2009-223886 describes displaying in a bubble chart the performance trend of an application that is a management target.

SUMMARY OF THE INVENTION

An administrator attempting to ameliorate a management target that has a problem needs to study an appropriate amelioration plan by taking into consideration the characteristics of the amelioration target, constraints originating from the information system, and the like. With the technology of Japanese Patent Application Laid-open No. 2009-223886, the administrator can check which application is exhibiting the trend of poor performance, but needs to study an appropriate amelioration plan himself/herself, which lowers the management efficiency of the administrator.

An object of this invention is therefore to provide a management system that improves the management efficiency of an administrator by presenting appropriate amelioration to the administrator.

According to the present invention to resolve the described above object, there is provided a management computer for managing a management target system in which a business system for executing a business is operated, the management computer comprising: an operation situation evaluating part for evaluating the business system by calculating an operation situation value which indicates an operation situation of the business system that is in operation; an operation situation displaying part for displaying the operation situation of the business system evaluated by the operation situation evaluating part; an amelioration plan generating part for identifying, as an amelioration plan, a business system configuration that ameliorates the operation situation of the business system that is in operation, based on the operation situation value calculated by the operation situation evaluating part; and an amelioration plan displaying part for displaying an operation situation that is expected in a case where the business system configuration identified by the amelioration plan generating part is applied, in association with the operation situation of the business system that is in operation.

This invention enables to provide the management system that improves the management efficiency of an administrator by presenting appropriate amelioration to the administrator.

Other objects, configurations, and effects than those described above are revealed in the following description of an embodiment.

BRIEF DESCRIPTION OF THE DRAWINGS

FIG. 5 is an explanatory diagram of charging definition information according to the first embodiment.

FIG. 6 is an explanatory diagram of system template information according to the first embodiment.

FIG. 7 is an explanatory diagram of virtual machine template information according to the first embodiment.

FIG. 8 is an explanatory diagram of business characteristics information according to the first embodiment.

FIG. 9 is an explanatory diagram of platform capacity information according to the first embodiment.

FIG. 10 is an explanatory diagram of business configuration information according to the first embodiment.

FIG. 11 is an explanatory diagram of business capacity utilization information according to the first embodiment.

FIG. 12 is an explanatory diagram of business operation situation information according to the first embodiment.

FIG. 13 is an explanatory diagram of amelioration plan information according to the first embodiment.

FIG. 32 is an explanatory diagram of adequacy ratio calculation source information according to the third embodiment.

DETAILED DESCRIPTION OF THE PREFERRED EMBODIMENTS

Modes for carrying out this invention are described below with reference to the drawings. To present a clearer picture, some things are omitted or simplified in the following description and the drawings as seen fit. Like components in one drawing and another drawing are denoted by like reference symbols, and duplicate descriptions are omitted if necessary for clarification.

First Embodiment

A first embodiment of this invention is described below with reference to FIGS. 1 to 28.

In a private could which provides a cloud environment within a company, a user in the company selects as in a public cloud a virtual machine and a system that fit his/her needs from a virtual machine list and system list provided at a private cloud portal, and pays the private cloud's operator (for example, an information system department) a usage fee depending on the amount of use of the selected virtual machine and system. An administrator of the information system department needs to keep track of the operation situation of the cloud system in order to provide a stable cloud service to users in the company.

An operation mode of a private cloud as this is described.

The administrator defines, in advance, system template information in which a system that can be provided to users and virtual machines constructing the system are registered. A user selects a system that fits the needs from the system template information, and instantiates (substantiates) the selected system. The user's business runs on the instantiated system. This embodiment discusses an information system that is operated based on system template information as this.

An advantage of this information system operation mode resides in that, because cases where the administrator deals with users' requests about the system configuration individually are reduced as much as possible, the operation of the information system can be commonalized/standardized, with the result that the running cost of the administrator is cut. From users' standpoint, an advantage of the above-mentioned operation mode, where a user only needs to select a system that fits the needs from the system template information to make a system available for his/her use, is that a system becomes available in a short time to a user in need of a new system, unlike when a request about the system configuration is submitted to the administrator and the time required till a new system is actually available is long.

Figure 1:
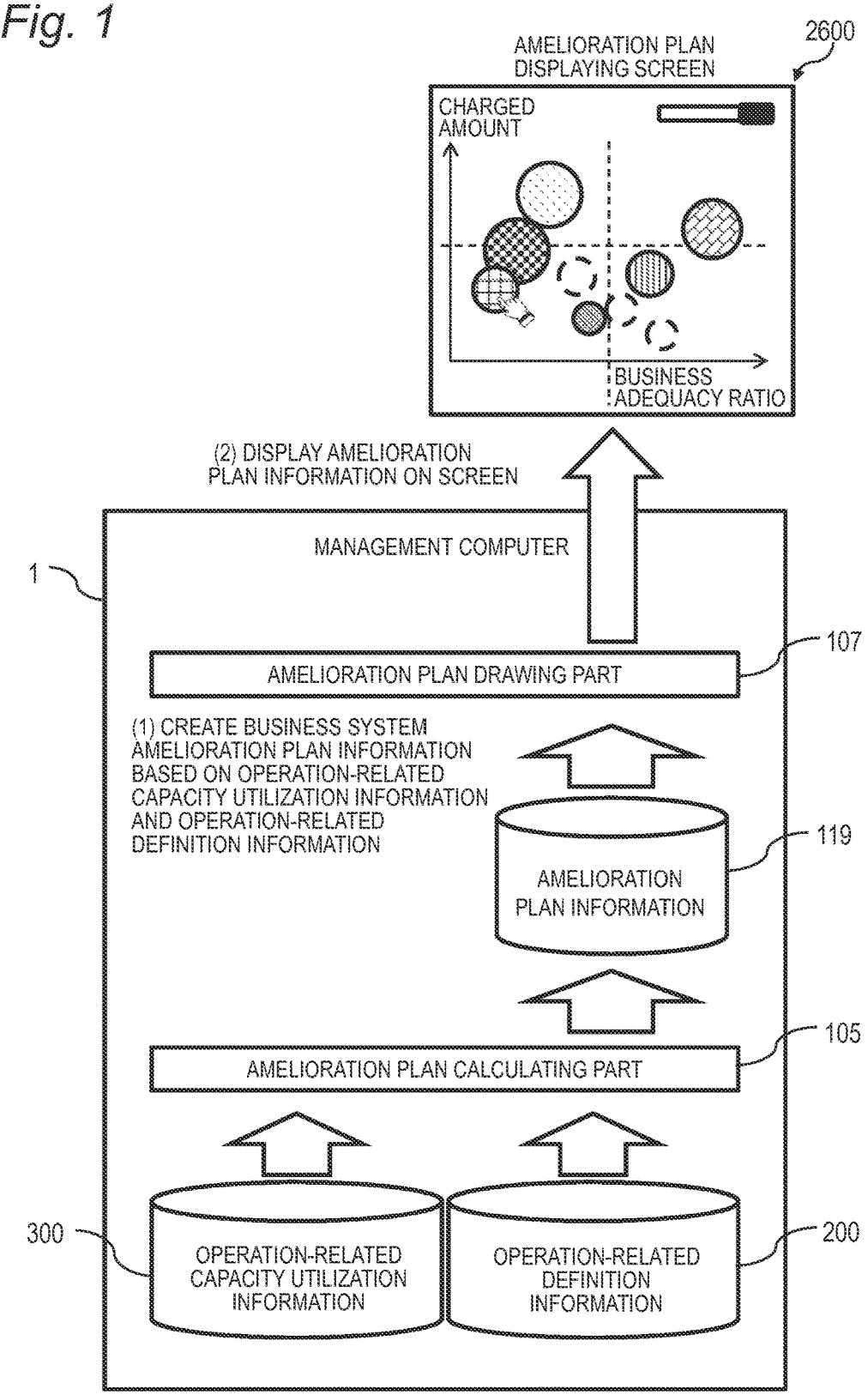
FIG. 1 is an explanatory diagram outlining a first embodiment.

FIG. 1 is an explanatory diagram outlining the first embodiment.

A management computer 1 is a computer for managing business systems which are management targets and which are provided to users, and includes operation-related definition information 200, operation-related capacity utilization information 300, amelioration plan information 119, an amelioration plan calculating part 105, and an amelioration plan drawing part 107. A business system provided to users runs on at least one virtual machine.

The operation-related definition information 200 is definition information necessary to run a business system, and details thereof are described with reference to FIG. 2. The operation-related capacity utilization information 300 is capacity utilization information of a business system that is in operation and others, and details thereof are described with reference to FIG. 2.

The amelioration plan calculating part 105 uses the operation-related definition information 200 and the operation-related capacity utilization information 300 to calculate an amelioration plan for each business system, and stores information about the amelioration plan in the amelioration plan information 119. The amelioration plan calculating part 105 determines a site that is an amelioration candidate and an amelioration policy based on the operation situation of a business system that is currently in operation, and calculates an amelioration plan by calculating the degree of amelioration that is accomplished when a new system template is applied to the business system. An amelioration candidate site may be identified by using a business adequacy ratio of a business system currently in operation as a resource that is deviated most from the adequacy ratio, or may be identified by other methods. In an example of the other methods, a resource to be ameliorated most (to be given the highest priority) considering characteristics information of a business system that is the amelioration target is identified as an amelioration candidate site.

Whether resources are in shortage or excess is determined based on the resource utilization situation of the amelioration candidate site. When resources are in shortage, an amelioration policy that dictates an increase in the resource allocation of the amelioration candidate site is set. When resources are in excess, an amelioration policy that dictates a decrease in the resource allocation of the amelioration candidate site is set. Other methods may be used to calculate an amelioration policy. For instance, an amelioration policy may be calculated based on the utilization situation of a resource that is to be ameliorated most (to be given the highest priority) considering characteristics information of a business system that is the amelioration target. An amelioration plan includes a post-amelioration business adequacy ratio, an amelioration method (e.g., information on a system template that is newly applied for amelioration), and the like.

Figure 26:
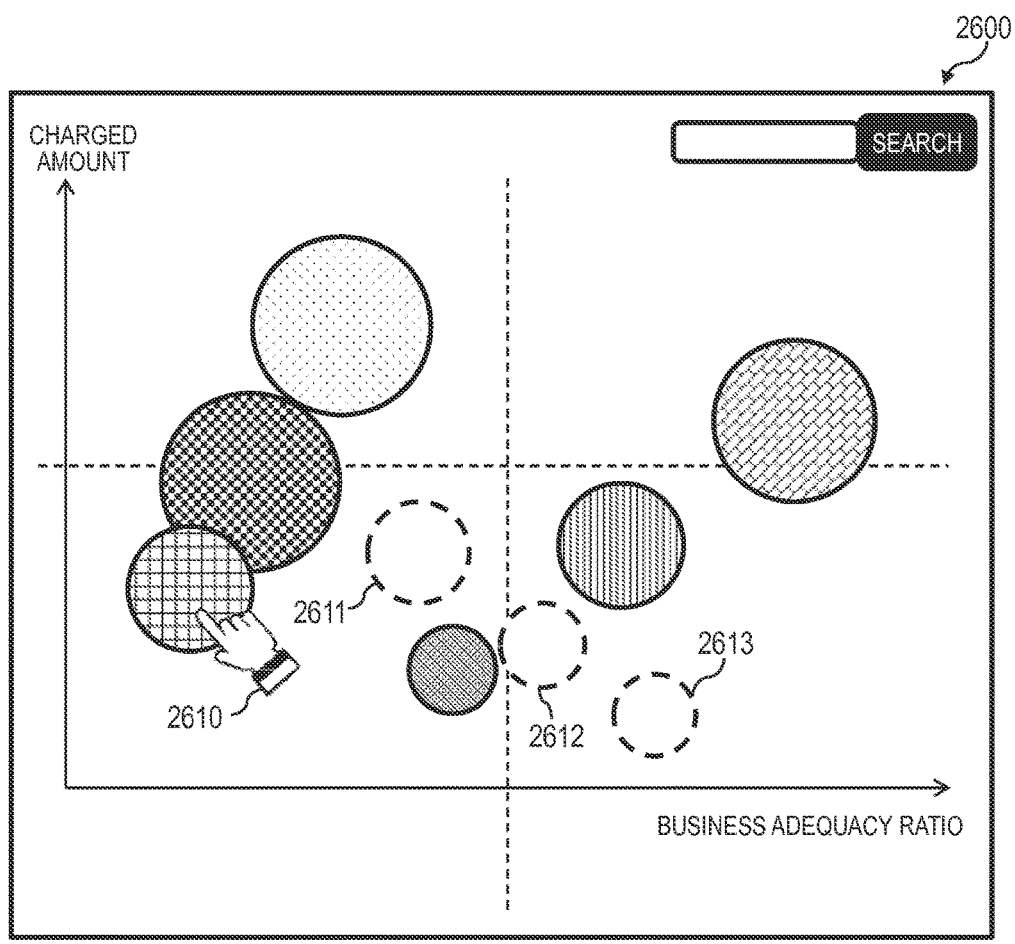
FIG. 26 is an explanatory diagram of an amelioration plan displaying screen according to the first embodiment.

The amelioration plan drawing part 107 refers to the amelioration plan information 119 to display an amelioration plan displaying screen 2600 illustrated in FIG. 26 which shows an amelioration plan for a selected business system in a bubble chart. The amelioration plan drawing part 107 desirably displays this screen in a manner that makes the selected business system distinguishable from a business system that is not selected. For instance, the amelioration plan drawing part 107 may display so that the selected business system is highlighted, or may draw other business systems in a color lighter than the drawing color of the selected business system. The displayed amelioration plan of the selected business system is desirably expressed differently from the business system. For instance, the amelioration plan of the selected business system may be displayed in a color similar but lighter than the drawing color of the business system, or a circular frame of the displayed amelioration plan may be indicated by a dotted line.

The administrator of management target systems can thus keep track of the overall operation situations of the management target systems, and can keep track of amelioration plans of the respective management target systems at the same time.

This enables the administrator to understand whether the situation of each management target system is adequate in the operation of a private cloud environment, and to easily grasp an appropriate resource utilization method for each management target system. The administrator can then recommend amelioration to the owners of the respective management target systems, and a wasteful use of private cloud resources which are assets of the management department is reduced. In addition, an owner who is running a management target system by utilizing the private cloud can know, as an amelioration plan, a resource usage that is appropriate for the running of the management target system, and can accordingly prevent a charge for the amount of wasteful use and a performance problem due to a shortage of resources.

Figure 2:
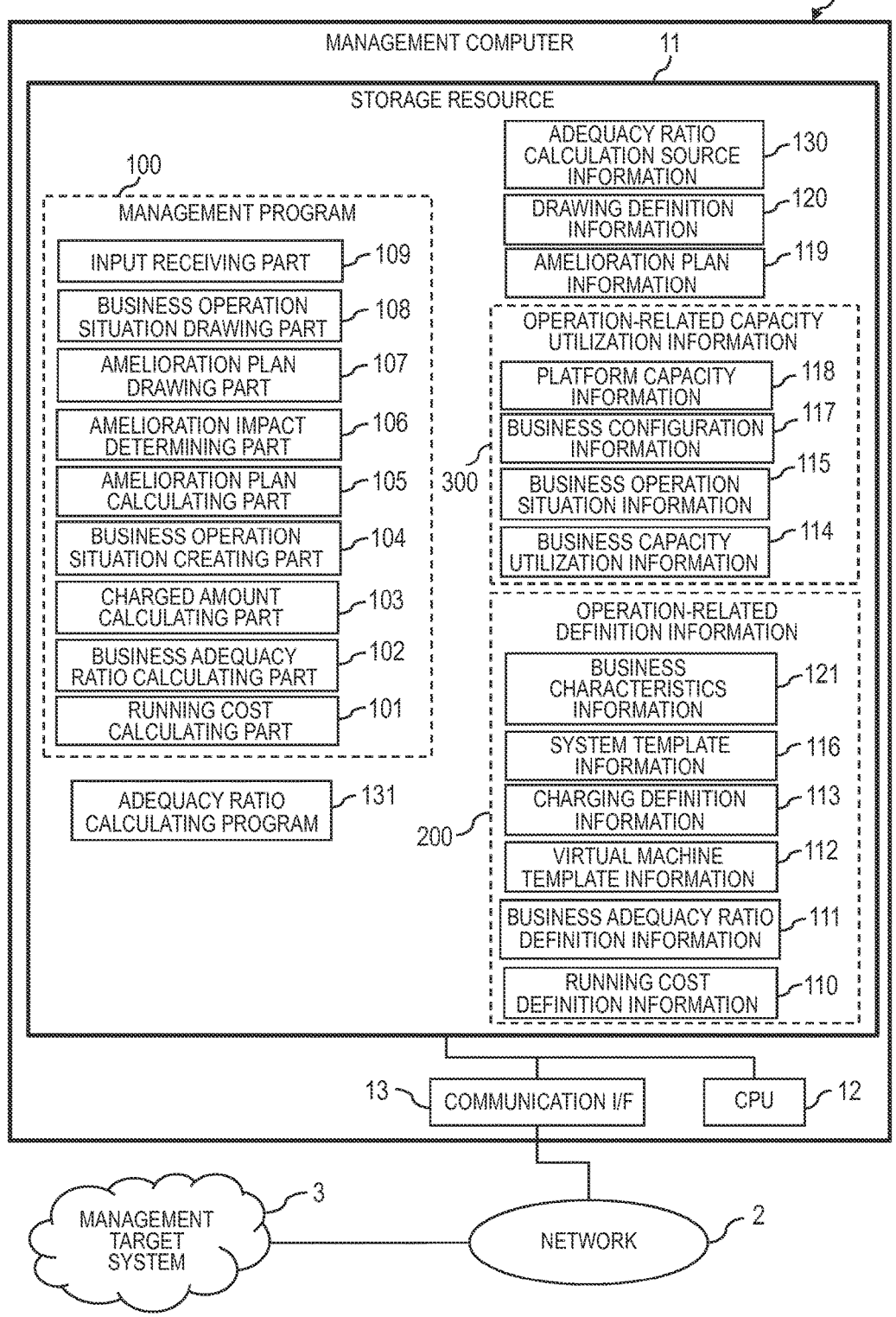
FIG. 2 is an explanatory diagram of a configuration of a management computer according to the first embodiment.

FIG. 2 is an explanatory diagram of the configuration of the management computer 1 according to the first embodiment.

The management computer 1 includes a storage resource 11, a CPU 12, and a communication interface (I/F) 13.

The CPU 12 executes various programs stored in the storage resource 11. The storage resource 11 stores a management program 100, an adequacy ratio calculating program 131, the operation-related definition information 200, the operation-related capacity utilization information 300, the amelioration plan information 119, drawing definition information 120, and adequacy ratio calculation source information 130. The adequacy ratio calculation source information 130 and the adequacy ratio calculating program 131 are not used in this embodiment, and details thereof are described in a third embodiment of this invention. The communication I/F 13 is coupled to a network 2. A management target system 3 is coupled to the network 2, and the management computer 1 obtains the resource utilization situation and the like of the management target system 3 via the network 2.

The operation-related definition information 200 is described. The operation-related definition information 200 includes running cost definition information 110, business adequacy ratio definition information 111, virtual machine template information 112, charging definition information 113, system template information 116, and business characteristics information 121.

In the running cost definition information 110, a running cost is registered for each virtual machine in association with the virtual machine. Details of the running cost definition information 110 are described with reference to FIG. 3. In the business adequacy ratio definition information 111, an adequate resource utilization ratio (adequacy ratio) is registered for each virtual machine in association with the virtual machine. Details of the business adequacy ratio definition information 111 are described with reference to FIG. 4.

In the virtual machine template information 112, a resource configuration definition is registered for each virtual machine with respect to resources allocated to the virtual machine. Details of the virtual machine template information 112 are described with reference to FIG. 7. A charging method definition is registered for each resource type in the charging definition information 113. Details of the charging definition information 113 are described with reference to FIG. 5.

Registered in the system template information 116 is the configuration of a business system, specifically, a relation with a virtual machine that is used by the business system. Details of the system template information 116 are described with reference to FIG. 6. Registered in the business characteristics information 121 for each business system type is a resource type that is given priority in the business system. Details of the business characteristics information 121 are described with reference to FIG. 8.

The operation-related capacity utilization information 300 is described next. The operation-related capacity utilization information 300 includes business capacity utilization information 114, business operation situation information 115, business configuration information 117, and platform capacity information 118.

In the business capacity utilization information 114, a capacity utilization situation of a virtual machine is registered for each virtual machine of a business system. Details of the business capacity utilization information 114 are described with reference to FIG. 11. An operation situation is registered for each business system in the business operation situation information 115. Details of the business operation situation information 115 are described with reference to FIG. 12.

A business system that is currently in operation and identification information of the business system are registered in the business configuration information 117. Details of the business configuration information 117 are described with reference to FIG. 10. Registered in the platform capacity information 118 are the resource capacity of the entire platform of the management target system 3 and the total running cost of the platform. Details of the platform capacity information 118 are described with reference to FIG. 9.

Registered in the amelioration plan information 119 for each business system are the specifics of an amelioration plan for the business system, a resource adequacy ratio that is reached when the amelioration plan is applied, and the like. Details of the amelioration plan information 119 are described with reference to FIG. 13. Registered in the drawing definition information 120 is a drawing rule to be followed when a business operation situation, amelioration plan, and the like of a business system are displayed. Details of the drawing definition information 120 are described with reference to FIG. 14.

The management program 100 is described next. The management program 100 is executed by the CPU 12, to thereby install a running cost calculating part 101, a business adequacy ratio calculating part 102, a charged amount calculating part 103, a business operation situation information creating part 104, the amelioration plan calculating part 105, an amelioration effect determining part 106, the amelioration plan drawing part 107, a business operation situation drawing part 108, and an input receiving part 109 in the management computer 1. These parts which are illustrated as being included in the management program 100 in FIG. 2 are installed in the management computer 1 by executing with the CPU 12 the management program 100 which includes programs corresponding to these parts.

Figure 16:
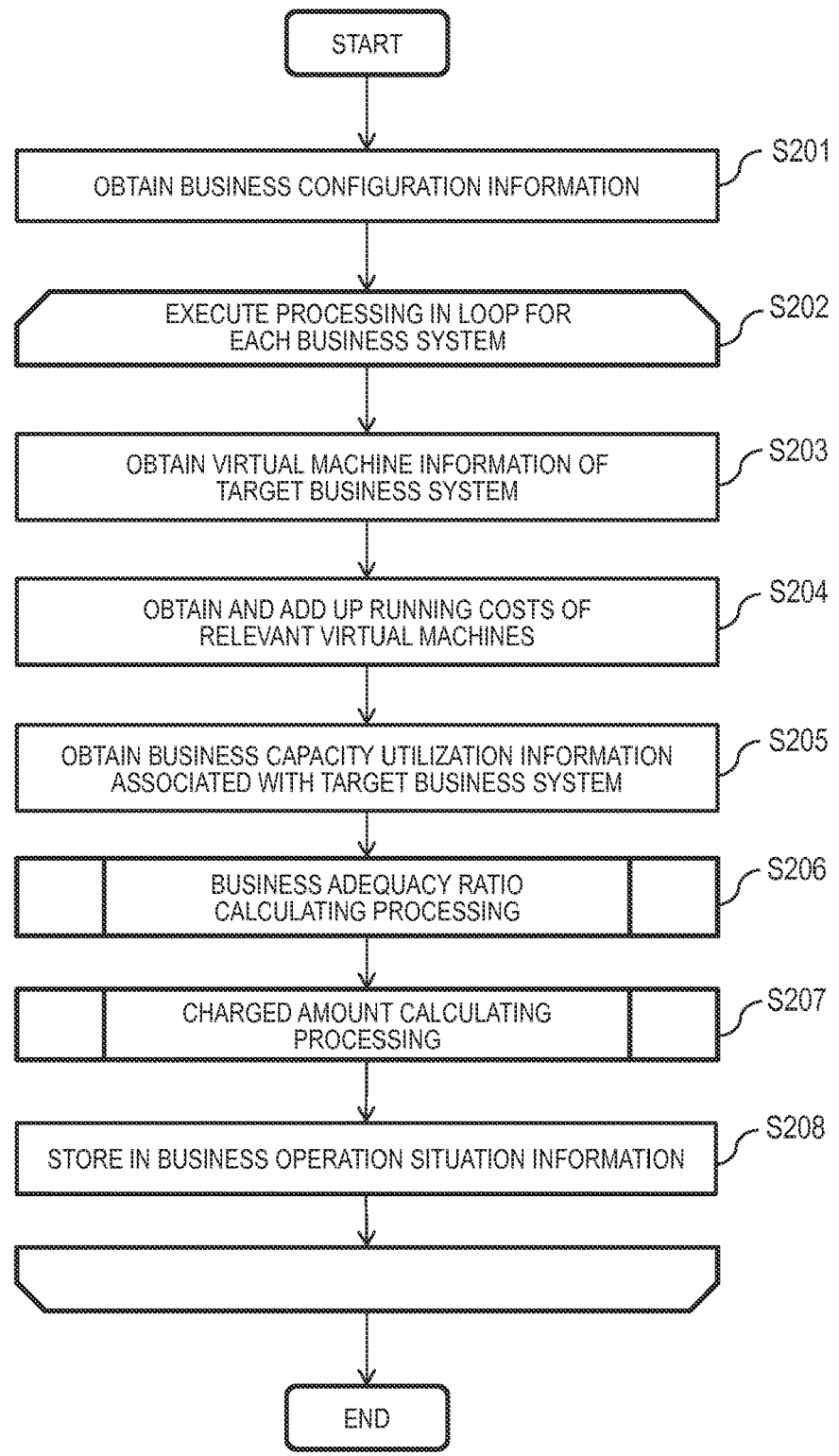
FIG. 16 is a flow chart of business operation situation information creating processing according to the first embodiment.
Figure 17:
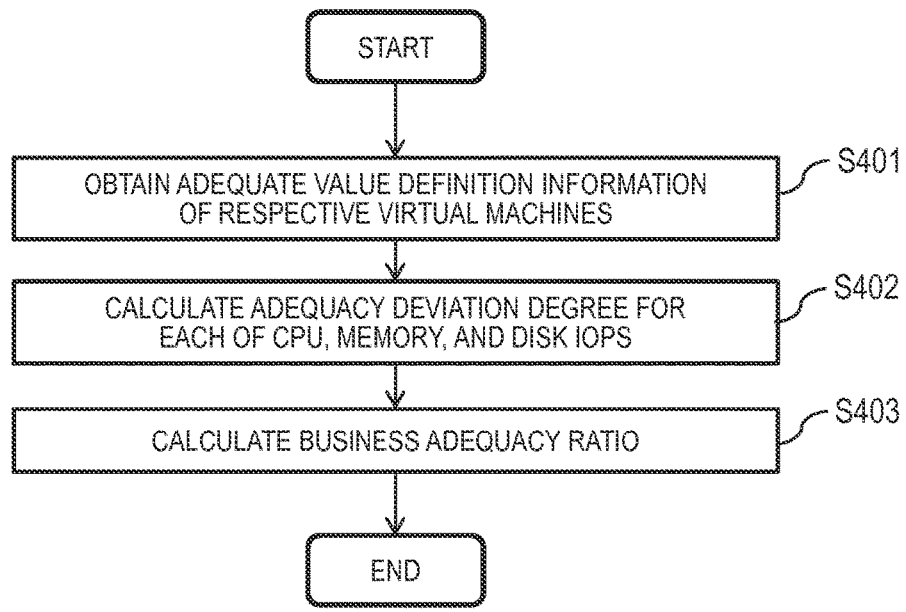
FIG. 17 is a flow chart of business adequacy ratio calculating processing according to the first embodiment.
Figure 18:
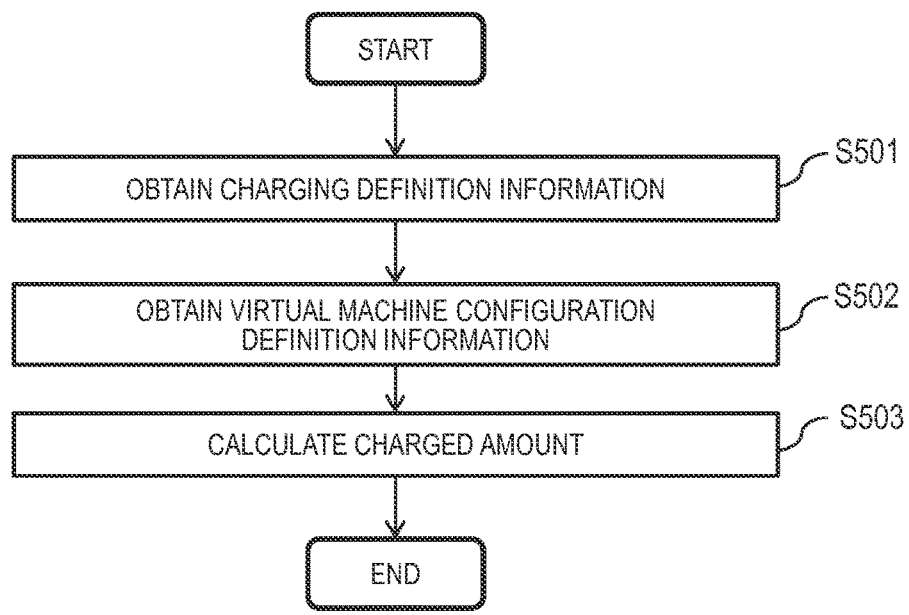
FIG. 18 is a flow chart of charged amount calculating processing according to the first embodiment.
Figure 19:
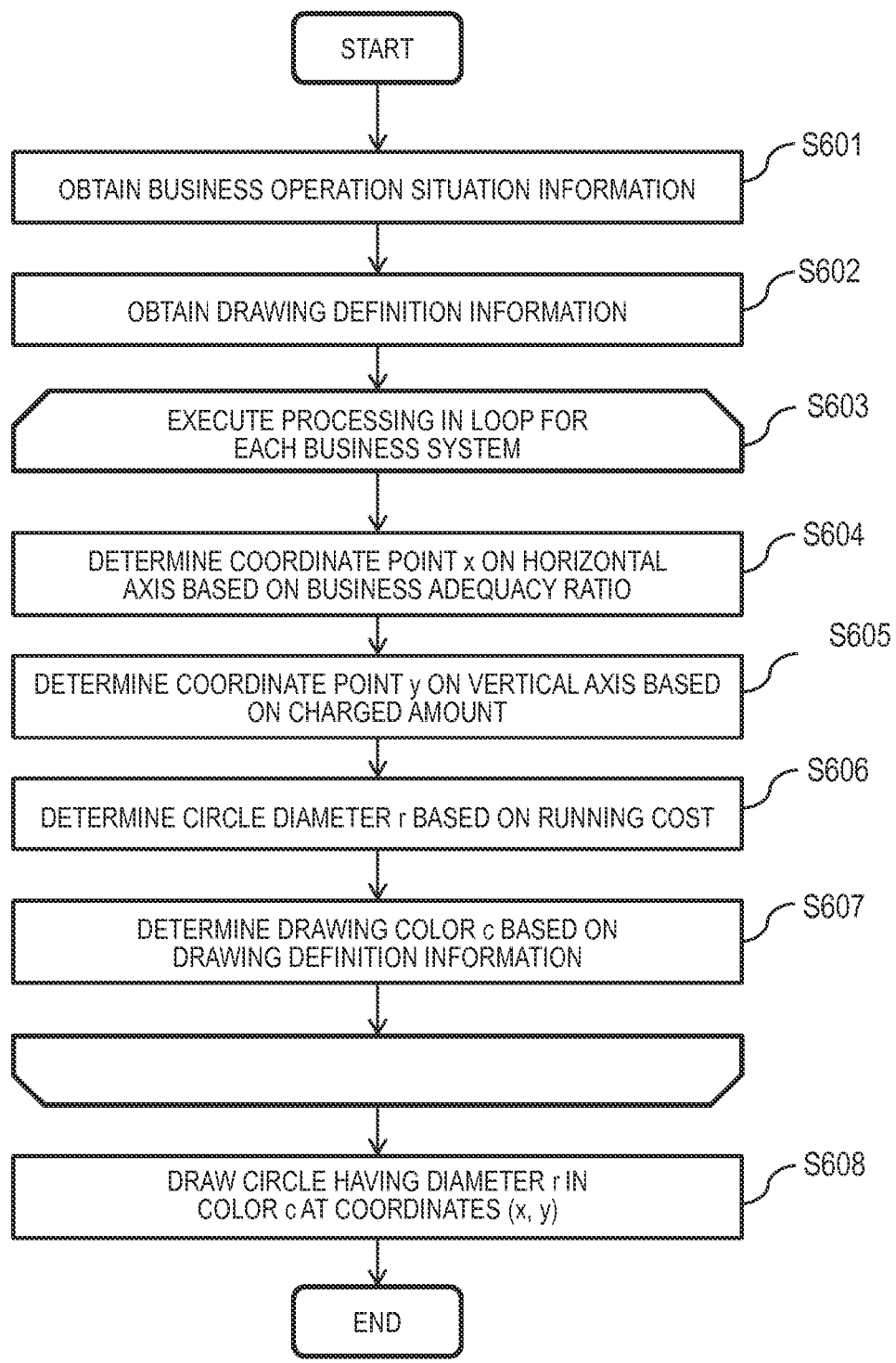
FIG. 19 is a flow chart of business operation situation information drawing processing according to the first embodiment.
Figure 20:
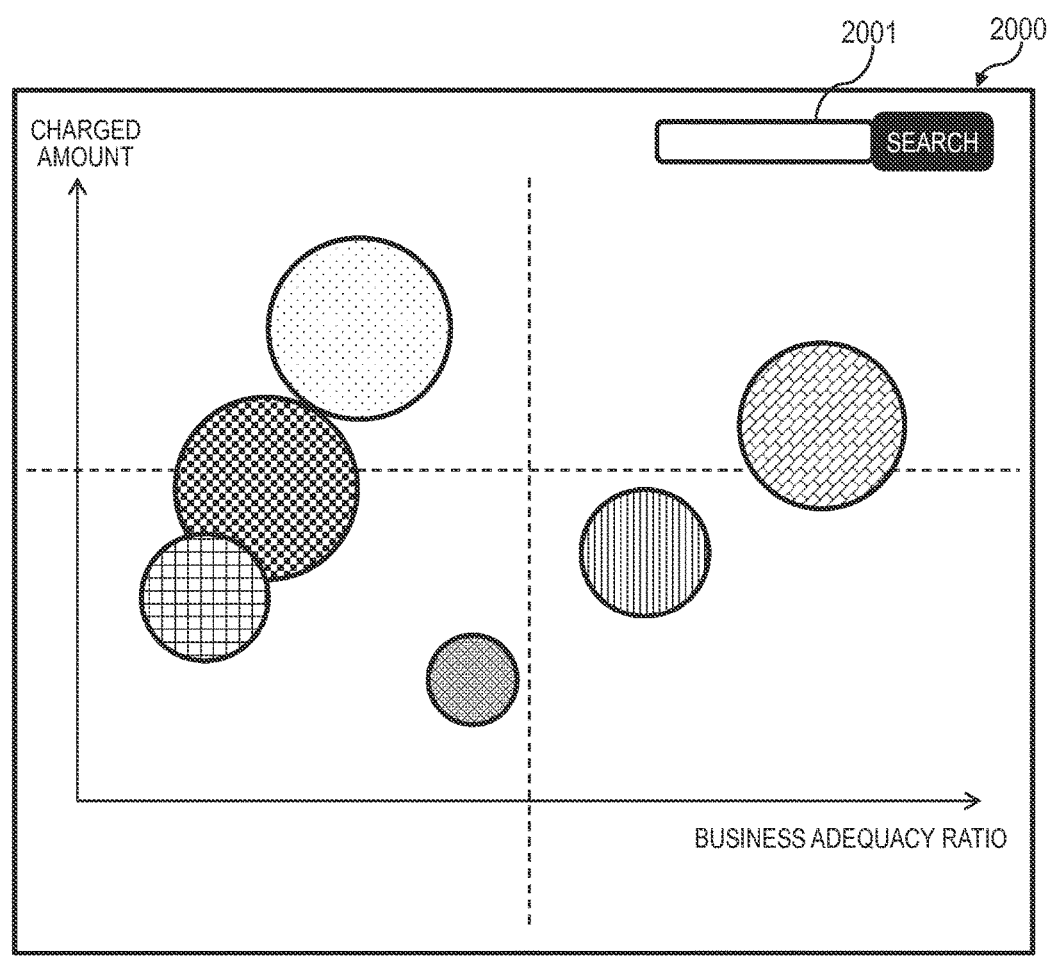
FIG. 20 is an explanatory diagram of an operation situation displaying screen according to the first embodiment.

The running cost calculating part 101 calculates the running cost of a business system in business operation situation information creating processing, which is illustrated in FIG. 16. The business adequacy ratio calculating part 102 calculates the business adequacy ratio of a business system in business adequacy ratio calculating processing, which is illustrated in FIG. 17. The charged amount calculating part 103 calculates an amount charged for a business system in charged amount calculating processing, which is illustrated in FIG. 18. The business operation situation information creating part 104 creates the business operation situation information 115 shown in FIG. 12 in the business operation situation information creating processing illustrated in FIG. 16. The business operation situation drawing part 108 displays an operation situation displaying screen 2000, which is illustrated in FIG. 20, in business operation situation information drawing processing, which is illustrated in FIG. 19, based on the business operation situation information 115 created by the business operation situation information creating part 104.

Figures 14, 15:
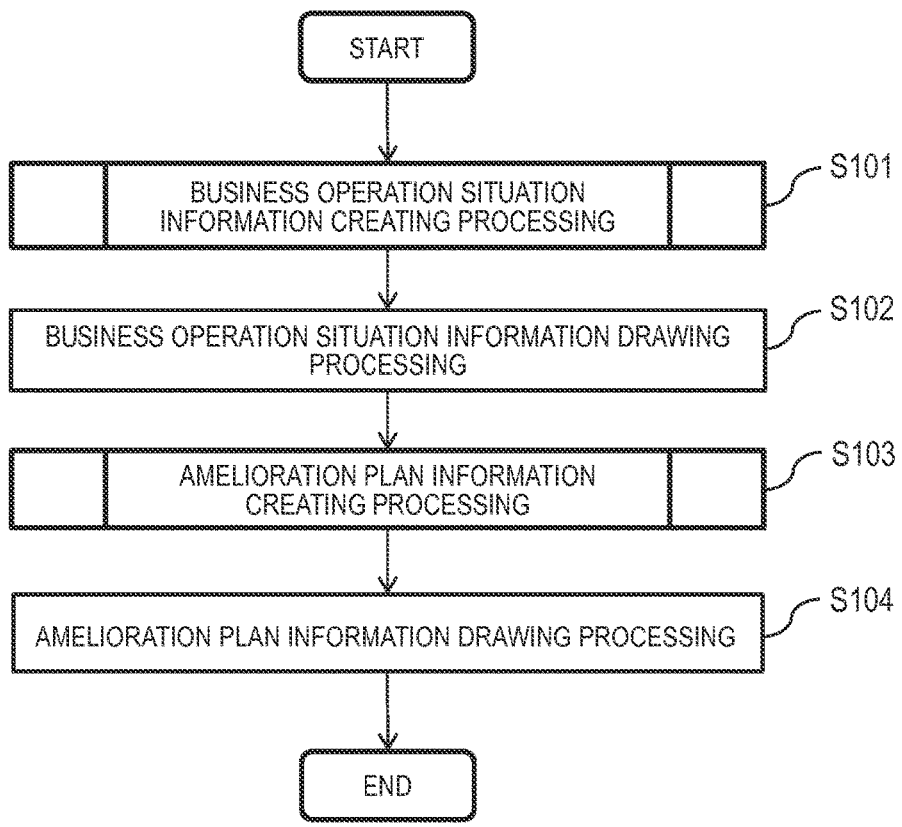
FIG. 14 is an explanatory diagram of drawing definition information according to the first embodiment.
FIG. 15 is a flow chart of overall processing by the management program according to the first embodiment.
Figure 22:
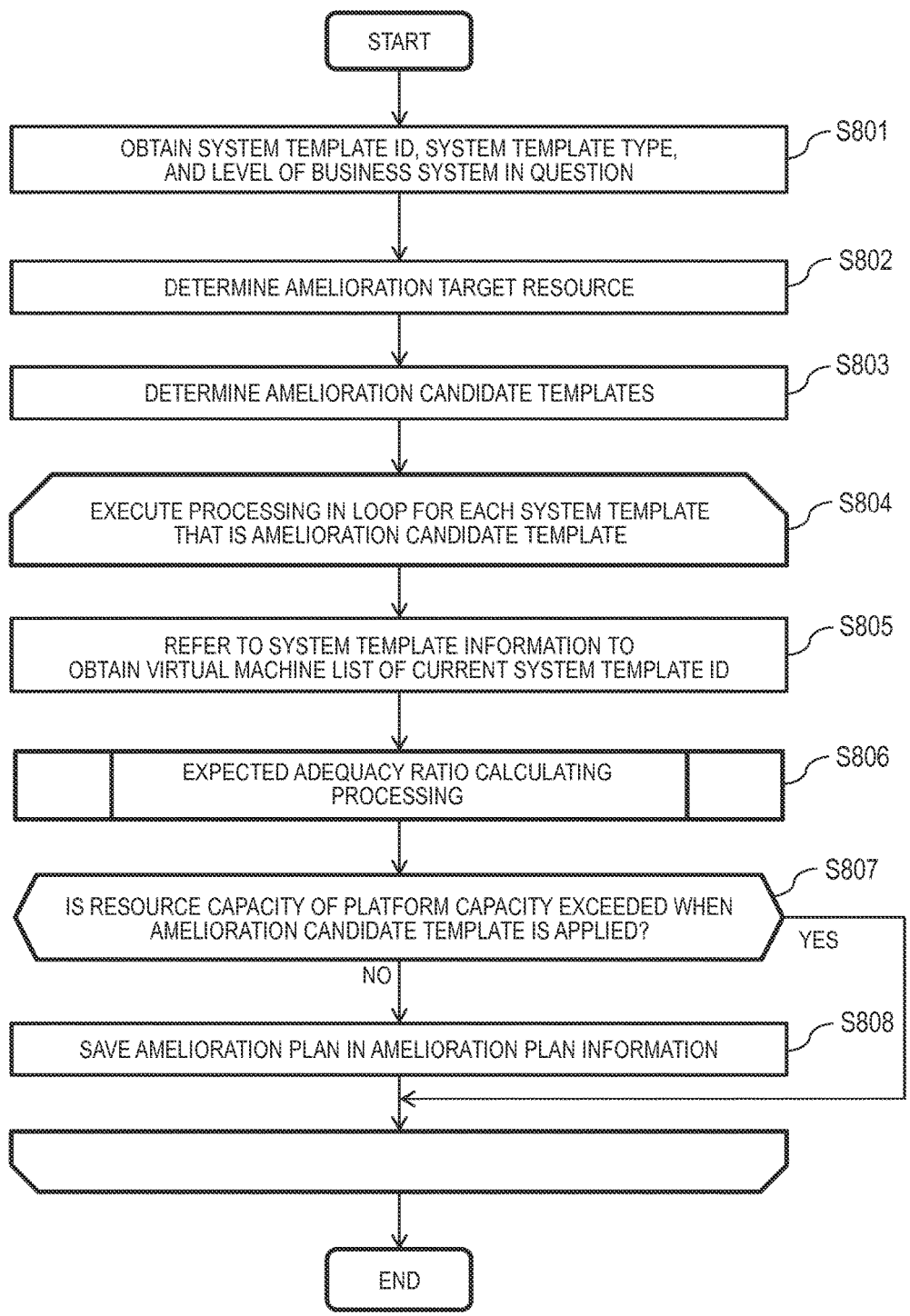
FIG. 22 is a flow chart of amelioration plan calculating processing according to the first embodiment.
Figure 24:
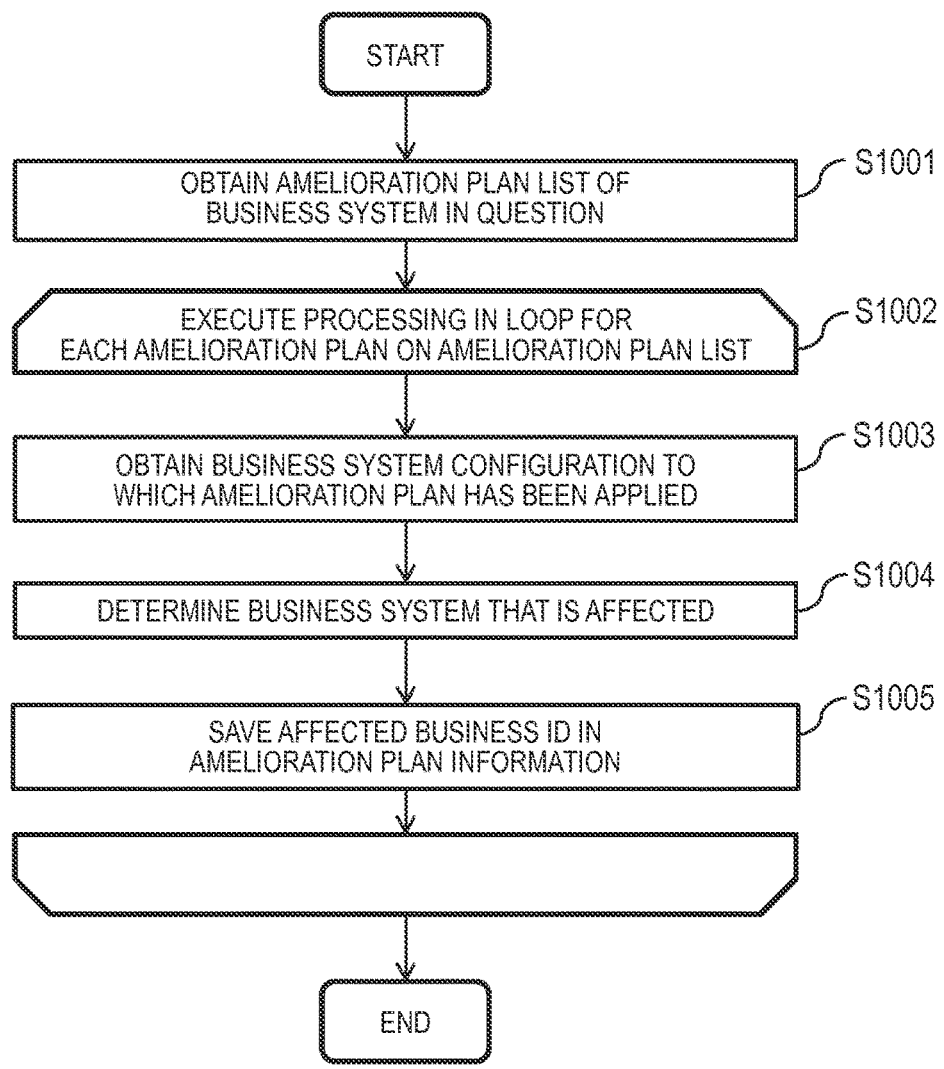
FIG. 24 is a flow chart of amelioration effect identifying processing according to the first embodiment.
Figure 25:
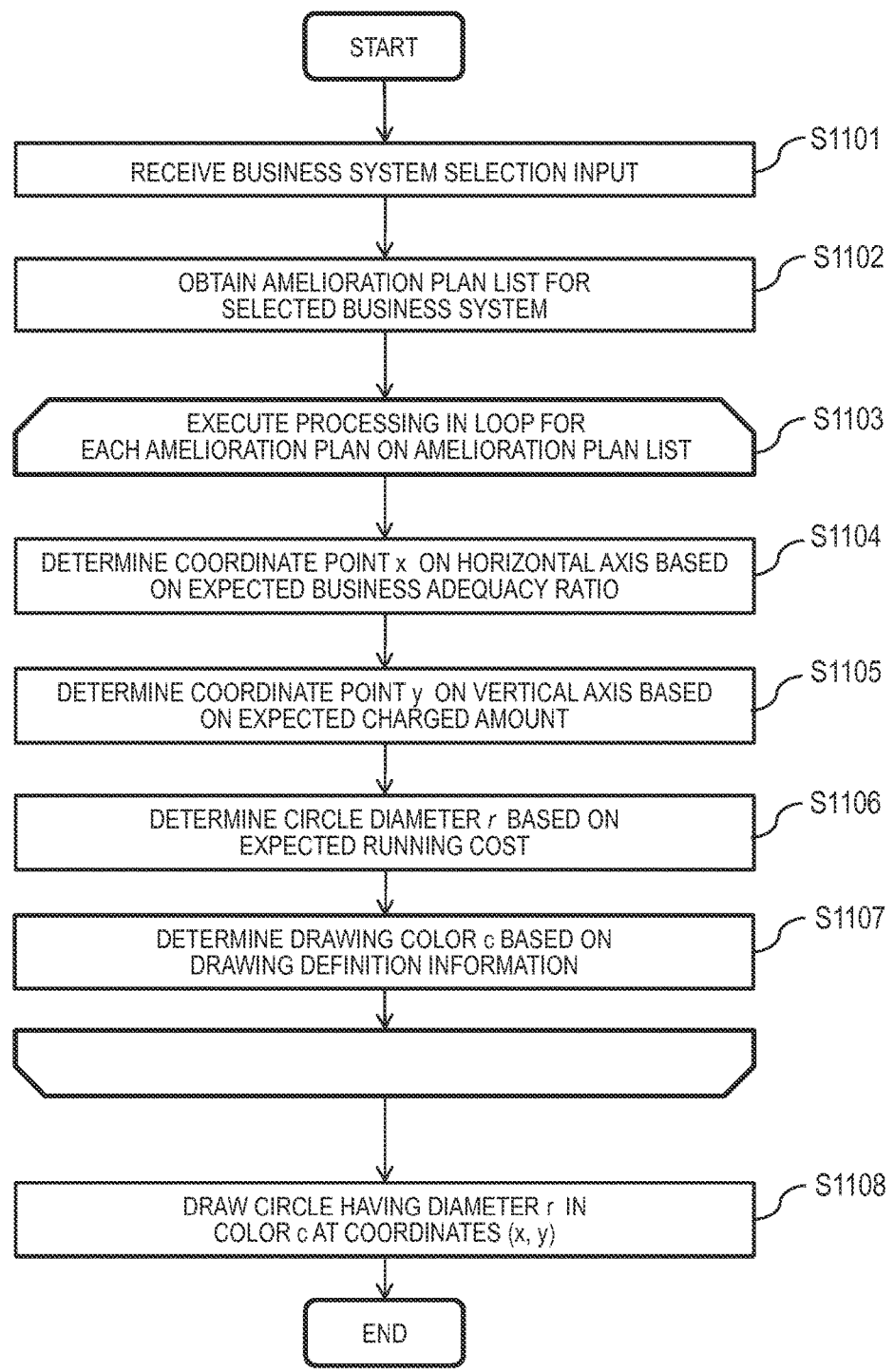
FIG. 25 is a flow chart of amelioration plan information drawing processing according to the first embodiment.

The amelioration plan calculating part 105 creates the amelioration plan information 119 shown in FIG. 14 for a business system in amelioration plan calculating processing, which is illustrated in FIG. 22. The amelioration effect determining part 106 identifies a business system that is affected by an amelioration plan in business effect determining processing, which is illustrated in FIG. 24. The amelioration plan drawing part 107 displays the amelioration plan displaying screen 2600, which is illustrated in FIG. 26, in amelioration plan drawing processing, which is illustrated in FIG. 25, based on the amelioration plan information 119 created by the amelioration plan calculating part 105.

The input receiving part 109 receives a manipulation input from the administrator.

The various types of information included in the operation-related definition information 200 are described next with reference to FIGS. 3 to 8. The various types of information included in the operation-related definition information 200 are set in advance by the administrator.

Figure 3:
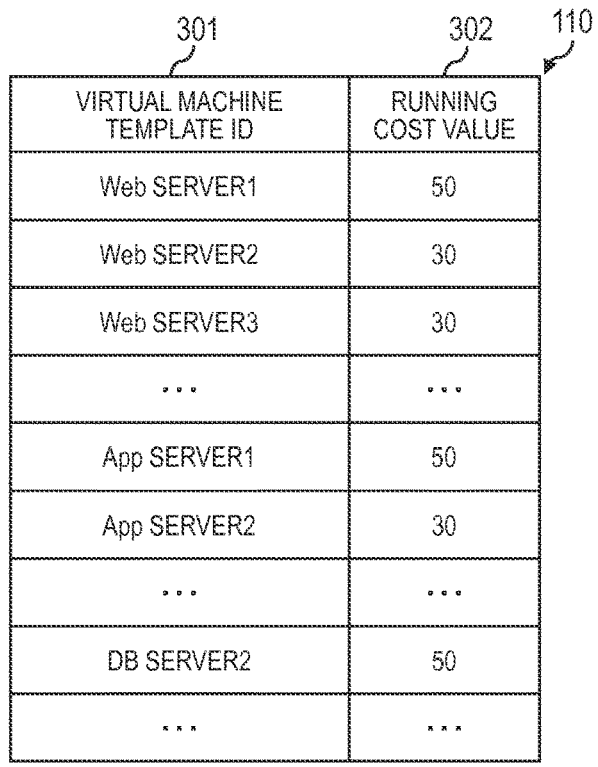
FIG. 3 is an explanatory diagram of running cost definition information according to the first embodiment.

FIG. 3 is an explanatory diagram of the running cost definition information 110 according to the first embodiment. The running cost definition information 110 includes a virtual machine template ID 301 and a running cost value 302.

Identification information of a virtual machine template is registered as the virtual machine template ID 301. Registered as the running cost value 302 is the value of a running cost necessary to manage a virtual machine that is instantiated from the virtual machine template identified by the virtual machine template identification information that is registered as the virtual machine template ID 301. The running cost value is a value calculated in advance based on information about a virtual machine (the type of the virtual machine, configuration information of the virtual machine, and the like). The running cost value may be, for example, the amount of resources consumed in order to manage the virtual machine, the labor cost of an administrator who manages the virtual machine, or the time required for the management of the virtual machine, or may be a value calculated based on a combination of these.

Figure 4:
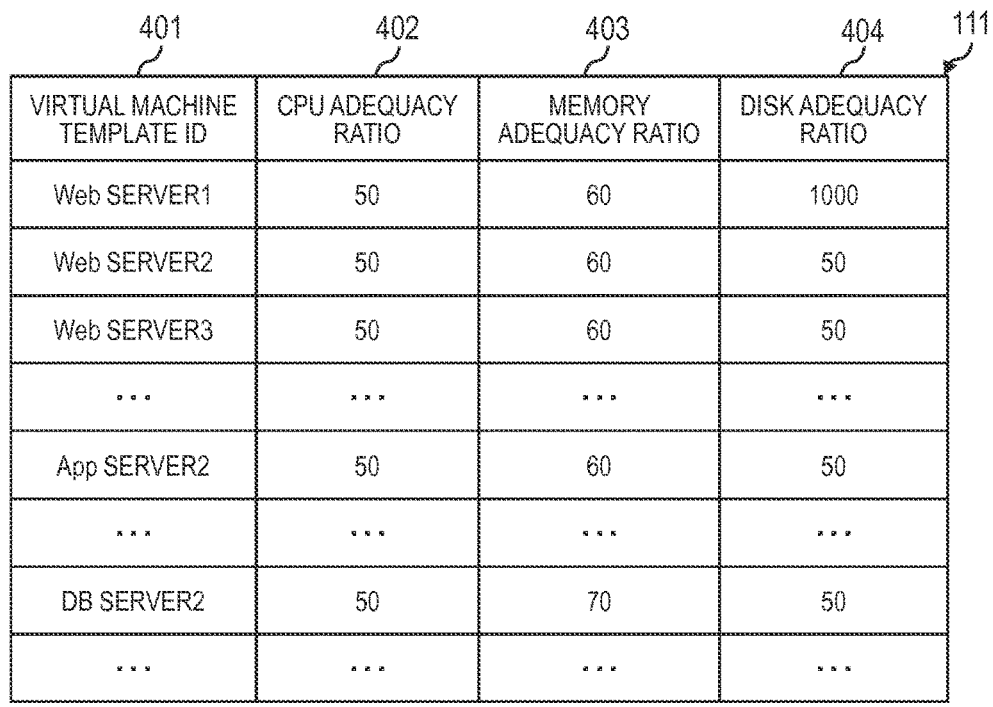
FIG. 4 is an explanatory diagram of business adequacy ratio definition information according to the first embodiment.

FIG. 4 is an explanatory diagram of the business adequacy ratio definition information 111 according to the first embodiment. The business adequacy ratio definition information 111 includes a virtual machine template ID 401, a CPU adequacy ratio 402, a memory adequacy ratio 403, and a disk adequacy ratio 404.

Identification information of a virtual machine template is registered as the virtual machine template ID 401. An adequate utilization ratio (adequacy ratio) of a CPU by the virtual machine is registered as the CPU adequacy ratio 402. An adequate utilization ratio (adequacy ratio) of a memory by the virtual machine is registered as the memory adequacy ratio 403. An adequate utilization ratio (adequacy ratio) of a disk device (auxiliary storage device) by the virtual machine is registered as the disk adequacy ratio 404.

The adequacy ratios registered as the CPU adequacy ratio 402 to the disk adequacy ratio 404 are values calculated in advance. Examples of how to calculate these adequacy ratios include setting specification values that are put on the products' respective pamphlets as the adequacy ratios, and setting, as the adequacy ratios, values that are obtained by processing the specification values. Alternatively, an average value, a median, a minimum value, a maximum value, or the like may be calculated for each of the resources based on past capacity utilization history information of the business system to be used as the adequacy ratio of the resource, or a standard deviation may be calculated for each of the resources based on the capacity utilization history information to be used as the adequacy ratio of the resource.

The adequacy ratio registered as the disk adequacy ratio 404 can be input/output per second (IOPS), disk utilization ratio, or the like of the disk device. The resource in the disk adequacy ratio 404 is not limited to a disk device such as a hard disk drive, and can be a solid state drive (SSD) or the like that function as an auxiliary storage device.

An example of processing of calculating adequacy ratios that are registered in the business adequacy ratio definition information 111 is described in detail in the third embodiment.

FIG. 5 is an explanatory diagram of the charging definition information 113 according to the first embodiment. The charging definition information 113 includes a resource type 501, a unit price 502, and a charging method 503.

Information by which the type of a resource used by a virtual machine can be identified is registered as the resource type 501. A value that can be used to calculate a charged amount which depends on the units of resource utilization is registered as the unit price 502. How the charged amount is charged is registered as the charging method 503. In FIG. 5, for example, whether the charging method is metered charging or fixed charging is registered. Metered charging is a method of charging depending on the hours of use, and fixed charging is a method of charging depending on the amount of resources allocated to the virtual machine.

The value registered as the unit price 502 is calculated in advance based on the operation mode and running expense (hardware expense and software expense) of the information system. In the case where the resource is a CPU, for example, a unit price is determined based on the frequency of the CPU. In the case where the resource is a memory or an SSD, a unit price is determined based on the capacity of the memory or the SSD.

FIG. 6 is an explanatory diagram of the system template information 116 according to the first embodiment. The system template information 116 includes a system template ID 601, a system template type 602, a level 603, a virtual machine A 604, a virtual machine B 605, a virtual machine C 606, and a virtual machine D 607.

Identification information of a business system template is registered as the system template ID 601. Identification information that indicates the type of the business system template is registered as the system template type 602. Level information indicating the grade of the business system template is registered as the level 603. Registered as the virtual machine A 604 to the virtual machine D 607 are pieces of identification information of virtual machine templates constructing the business system template.

A business system template is instantiated based on the system template information 116, and a business system is thus built.

Information defined in advance by the administrator or others is registered in the system template information 116. The administrator or others may define the system template information 116 based on their experiences or others. The system template information 116 may instead be defined based on past capacity utilization history information of the business system.

Types such as "Web system" and "development system" are registered as the system template type 602 in FIG. 6.

However, the system template type 602 is not limited thereto. For example, a system template which covers up to business applications (e.g., "enterprise resource planning (ERP) system"), a virtual machine template which covers up to middleware (e.g., "database (DB) server"), and specific-use virtual machines (e.g., "high-speed computing virtual machine") may be registered.

A numerical value is registered as level information of the level 603 in FIG. 6, and a lower value indicates a higher grade of a business system template. When the template of a business system has a higher grade, more virtual machines construct the business system and a larger resource capacity is allocated to the business system. Any kind of level information that indicates the grade of a business system template can be registered as the level 603, and a letter string (e.g., "A", "B", "C", and the like, or "high", "mid", "low", and the like) may be registered instead of a numerical value.

FIG. 7 is an explanatory diagram of the virtual machine template information 112 according to the first embodiment. The virtual machine template information 112 includes a virtual machine template ID 701, a CPU 702, a memory 703, a disk capacity 704, and a disk type 705.

Identification information of a virtual machine template is registered as the virtual machine template ID 701. Registered as the CPU 702 is a CPU frequency that is allocated to a virtual machine built by instantiating the template that is identified by the virtual machine template identification information. Registered as the memory 703 is a memory capacity that is allocated to the virtual machine built by instantiating the template that is identified by the virtual machine template identification information. Registered as the disk capacity 704 is a disk device capacity that is allocated to the virtual machine built by instantiating the template that is identified by the virtual machine template identification information. Identification information that indicates a disk device type is registered as the disk type 705. The identification information that indicates a disk device type is, for example, "SATA" and "SSD", but is not limited thereto. "SATA" means a disk device (hard disk drive) connected by SATA.

The resource capacities allocated to the virtual machine may be calculated from the administrator's experience, or based on past capacity utilization history information of the business system.

FIG. 8 is an explanatory diagram of the business characteristics information 121 according to the first embodiment. The business characteristics information 121 includes a system template type 801 and characteristics information 802.

Identification information that indicates a business system template type is registered as the system template type 801. Information indicating which resource is given priority by the business system template type is registered as the characteristics information 802.

The information registered as the characteristics information 802 may be calculated based on the experience of the administrator or others. Alternatively, which resource tends to be high in utilization ratio may be analyzed based on past capacity utilization history information of the business system, so that information indicating that a resource whose utilization ratio is higher than a given value is given priority is registered as the characteristics information 802.

The various types of information included in the operation-related capacity utilization information 300 are described next with reference to FIGS. 9 to 12. The various types of information included in the operation-related capacity utilization information 300 are updated dynamically based on information that the management computer 1 obtains from the management target system 3.

FIG. 9 is an explanatory diagram of the platform capacity information 118 according to the first embodiment. The platform capacity information 118 is for managing for each resource type of a management target system the total capacity (full capacity) of the resource type, and the sum of capacities (allocated capacity) of the resource type that have been allocated to virtual machines. The platform capacity information 118 includes an item 901, a full capacity 902, and an allocated capacity 903.

Registered as the item 901 is identification information that indicates the type of a resource or the like of a management target system for which the full capacity and the allocated capacity are calculated. Registered as the full capacity 902 for each resource of the management target system is the total capacity value of the resource. Registered as the allocated capacity 903 for each resource type of the management target system is the sum value of capacities of the resource type that have been allocated to virtual machines.

The total capacity value registered as the full capacity 902 for each resource type may be calculated based on hardware specification information of the management target system 3, or may be calculated based on other types of information (e.g., in the case where there is a system that manages the configuration of the management target system 3, information of this system). In a record where the item 901 is "running cost", a value calculated in advance is registered as the full capacity 902. This can be calculated by obtaining the sum value of the capacities of resources that are included in the system for managing the configuration of the management target system 3. The value registered as the full capacity 902 in a record where the item 901 is "running cost" can also be calculated by other methods, and may be calculated by, for example, subtracting working hours that are currently allocated to the administrator from the office hours of the administrator.

How to calculate the sum value that is registered as the allocated capacity 903 is described. The business configuration information 117 of FIG. 10 is referred to first in order to identify template identification information of a business system that is currently in operation, and the system template information 116 of FIG. 6 is referred to in order to identify identification information of virtual machines constructing the business system currently in operation. The virtual machine template information 112 of FIG. 7 is then referred to in order to identify, for each of the virtual machines and for each type of resource allocated to the virtual machine, the capacity of the resource type. For each resource type, capacities of the resource type of all virtual machines constructing the business system currently in operation are added up, and the sum value registered as the allocated capacity 903 is thus calculated.

The sum value that is registered as the allocated capacity 903 when the item 901 is "running cost" is calculated by a method different from the calculation method described above, and details thereof are described. Identification information of a template of a business system that is currently in operation is identified first, and the system template information 116 of FIG. 6 is referred to in order to identify identification information of virtual machines constructing the business system currently in operation. The running cost definition information 110 of FIG. 3 is then referred to in order to obtain a running cost value for each of the virtual machines constructing the business system. The running cost values of all virtual machines constructing the business system currently in operation are added up, and the sum value registered as the allocated capacity 903 when the item 901 is "running cost" is thus calculated.

The method of calculating the sum value that is registered as the allocated capacity 903 may be executed by a sum calculating program (not shown) of the management computer 1, or the administrator may calculate the sum value by following the calculation method. The calculation of the sum value that is registered as the allocated capacity 903 is not limited to the method described above and, in the case where there is a system for managing capacity utilization information of a business system that is currently in operation, may be based on information of the system.

FIG. 10 is an explanatory diagram of the business configuration information 117 according to the first embodiment. The business configuration information 117 includes a business system ID 1001 and a system template ID 1002.

Identification information of a business system that is currently in operation is registered as the business system ID 1001. Identification information of a template of the business system currently in operation is registered as the system template ID 1002.

FIG. 11 is an explanatory diagram of the business capacity utilization information 114 according to the first embodiment. In the business capacity utilization information 114, information about the capacity utilization of virtual machines constructing a business system is registered for each business system that is currently in operation.

The business capacity utilization information 114 includes a virtual machine template ID 1101, a virtual machine name 1102, a CPU utilization ratio 1103, a memory utilization ratio 1104, a disk utilization ratio 1105, and a running time 1106.

Identification information of a template of a virtual machine constructing a business system is registered as the virtual machine template ID 1101. A virtual machine name that is identification information of the virtual machine is registered as the virtual machine name 1102.

A CPU utilization ratio of the virtual machine is registered as the CPU utilization ratio 1103. A memory utilization ratio of the virtual machine is registered as the memory utilization ratio 1104. A disk utilization ratio of the virtual machine is registered as the disk utilization ratio 1105. The running time of the virtual machine is registered as the running time 1106.

The management computer 1 updates the business capacity utilization information 114 when obtaining capacity utilization information from at least one of a capacity utilization information management system for managing capacity utilization information of a management target system and a virtualized environment management system.

FIG. 12 is an explanatory diagram of the business operation situation information 115 according to the first embodiment. The business operation situation information 115 is created in the business operation situation information creating processing illustrated in FIGS. 16 to 18.

The business operation situation information 115 includes a business ID 1201, a business adequacy ratio 1202, a CPU adequacy deviation degree 1203, a memory adequacy deviation degree 1204, a disk adequacy deviation degree 1205, a charged amount 1206, and a running cost 1207.

Identification information of a business system is registered as the business ID 1201. The degree of deviation of the business system from an adequate resource utilization ratio (business adequacy ratio) is registered as the business adequacy ratio 1202. Details of the business adequacy ratio 1202 are described with reference to FIG. 17. Registered as the CPU adequacy deviation degree 1203 is a CPU deviation degree that is deviated most from a CPU adequacy ratio among virtual machines constructing the business system. A CPU deviation degree indicates the degree of deviation of a virtual machine from a CPU adequacy ratio. Registered as the memory adequacy deviation degree 1204 is a memory deviation degree that is deviated most from a memory adequacy ratio among the virtual machines constructing the business system. A memory deviation degree indicates the degree of deviation of a virtual machine from a memory adequacy ratio. Registered as the disk adequacy deviation degree 1205 is a disk deviation degree that is deviated most from a disk device adequacy ratio among the virtual machines constructing the business system. A disk deviation degree indicates the degree of deviation of a virtual machine from a disk device adequacy ratio.

An amount charged for the business system in a given period of time is registered as the charged amount 1206. The running cost of the business system is registered as the running cost 1207.

The business adequacy ratio, charged amount, and running cost of a business system are operation situation values that indicate the operation situation of the business system.

FIG. 13 is an explanatory diagram of the amelioration plan information 119 according to the first embodiment. The amelioration plan information 119 is created in amelioration plan information creating processing illustrated in FIGS. 21 to 24 for each business system.

The amelioration plan information 119 includes an amelioration plan ID 1301, an amelioration plan 1302, an expected business adequacy ratio 1303, an expected CPU adequacy deviation degree 1304, an expected memory adequacy deviation degree 1305, an expected disk adequacy deviation degree 1306, an expected charged amount 1307, an expected running cost 1308, and an affected business ID 1309.

Identification information of an amelioration plan is registered as the amelioration plan ID 1301. The specifics of the amelioration plan are registered as the amelioration plan 1302. A business adequacy ratio that is expected when the amelioration plan is applied to the business system is registered as the expected business adequacy ratio 1303. A CPU adequacy deviation degree that is expected when the amelioration plan is applied to the business system is registered as the expected CPU adequacy deviation degree 1304. A memory adequacy deviation degree that is expected when the amelioration plan is applied to the business system is registered as the expected memory adequacy deviation degree 1305. A disk adequacy deviation degree that is expected when the amelioration plan is applied to the business system is registered as the expected disk adequacy deviation degree 1306. A running cost that is expected when the amelioration plan is applied to the business system is registered as the expected running cost 1308. Registered as the affected business ID 1309 is identification information of a business system that is affected when the amelioration plan is applied to the business system in question.

FIG. 14 is an explanatory diagram of the drawing definition information 120 according to the first embodiment. The drawing definition information 120 includes a business system ID 1401 and a drawing rule 1402.

Identification information of a business system is registered as the business system ID 1401. A drawing rule that is to be followed when the business operation situation, an amelioration plan, and the like are displayed for the business system is registered as the drawing rule 1402. A drawing rule is information about, among others, which colors are to be assigned to a displayed business operation situation and displayed amelioration plan of a business system so that the business operation situation and amelioration plan of the business system can be distinguished from the business operation situation and amelioration plan of another business system.

Processing in which the management program 100 displays a business operation situation and an amelioration plan is described next with reference to FIGS. 15 to 26.

FIG. 15 is a flow chart of overall processing by the management program 100 according to the first embodiment. This overall processing may be executed by the management program 100 at given timing, or may be executed when a request from a user is received.

The management program 100 first calculates an operation situation value that indicates an operation situation for each business system that is in operation, registers the calculated operation situation value in the business operation situation information 115, and executes the business operation situation information creating processing for creating the business operation situation information 115 (Step S101). Details of the business operation situation information creating processing are described with reference to FIGS. 16 to 18.

The management program 100 next executes the business operation situation information drawing processing for displaying the operation situation displaying screen 2000 illustrated in FIG. 20 based on the business operation situation information 115 created in Step S101 (Step S102). Details of the business operation situation information drawing processing are described with reference to FIG. 19. The business operation situation information drawing processing may be executed subsequently to Step S101, or may be executed when a request from a user is received.

The management program 100 next identifies an amelioration plan that ameliorates the operation situation of the business system that is in operation based on the business operation situation information 115 created in Step S101, and executes the amelioration plan information creating processing for creating the amelioration plan information 119 (Step S103). Details of the amelioration plan information creating processing are described with reference to FIGS. 21 to 24. The amelioration plan information creating processing may be executed subsequently to Step S102, or may be executed when a request from a user is received.

The management program 100 next executes the amelioration plan information drawing processing for displaying the amelioration plan displaying screen 2600 based on the amelioration plan information 119 created in Step S103 (Step S104), and ends the processing. Details of the amelioration plan information drawing processing are described with reference to FIG. 25. The amelioration plan information drawing processing may be executed subsequently to Step S103, or may be executed when a request from a user is received.

Processing up to the display of the operation situation displaying screen 2000 is described with reference to FIGS. 16 to 20.

FIG. 16 is a flow chart of the business operation situation information creating processing according to the first embodiment. The business operation situation information creating processing is executed by the business operation situation information creating part 104.

The business operation situation information creating part 104 first refers to the business configuration information 117 of FIG. 10 to obtain identification information of a business system (hereinafter referred to as business system ID) for each business system that is currently in operation (Step S201).

The business operation situation information creating part 104 next selects one business system ID that is a processing target from the business system IDs obtained in Step S201 (Step S202) and executes Steps S203 to S207. When executing Steps S203 to S207 is finished for every business system ID obtained in Step S201, the business operation situation information creating processing is ended.

The business operation situation information creating part 104 obtains identification information of a virtual machine template (hereinafter referred to as virtual machine template ID) used by a virtual machine for each virtual machine constructing the business system identified by the processing target business system ID (Step S203).

A concrete description is given on Step S203. The business operation situation information creating part 104 first refers to the business configuration information 117 of FIG. 10 to obtain identification information of a template used by a business system (a system template ID) that is identified by the processing target business system ID. The business operation situation information creating part 104 then refers to the system template information 116 of FIG. 6 to obtain, from a record in which the obtained system template ID is registered as the system template ID 601, virtual machine template IDs registered as the virtual machine A 604 to the virtual machine D 607. For example, when the processing target business system ID is a "business system A", a system template ID "3" is obtained from the business configuration information 117 of FIG. 10, and virtual machine template IDs "Web server 2", "App server 2", and "DB server 2" are obtained from the system template information 116 of FIG. 6.

The business operation situation information creating part 104 next refers to the running cost definition information 110 of FIG. 3 to obtain running cost values for the virtual machine template IDs obtained in Step S203, and adds up the obtained running cost values to calculate the running cost of the business system identified by the processing target business system ID (Step S204). Specifically, the business operation situation information creating part 104 obtains, from records of the running cost definition information 110 in which the virtual machine template IDs obtained in Step S203 are registered as the virtual machine template ID 301, running costs registered as the running cost value 302. The business operation situation information creating part 104 adds up the obtained running costs to calculate the running cost of the business system. The business system running cost calculated in Step S204 is one of operation situation values that indicate the operation situation of the business system.

The running cost of the business system A, for example, is calculated as "110" by adding up running costs "30", "30", and "50" for the virtual machine template IDs "Web server 2", "App server 2", and "DB server 2".

The business operation situation information creating part 104 next obtains the business capacity utilization information 114 shown in FIG. 11 that is associated with the processing target business system ID (Step S205).

Based on the business capacity utilization information 114 obtained in Step S205, the business operation situation information creating part 104 has the business adequacy ratio calculating part 102 execute the business adequacy ratio calculating processing (Step S206). The business adequacy ratio calculating processing is processing for calculating a business adequacy ratio, which is one of operation situation values of the business system and which indicates the degree of deviation of the business system from an adequate resource utilization ratio. Details of the business adequacy ratio calculating processing are described with reference to FIG. 17.

The business operation situation information creating part 104 next has the charged amount calculating part 103 execute the charged amount calculating processing for calculating a charged amount which is one of operation situation values of the business system (Step S207). Details of the charged amount calculating processing are described with reference to FIG. 18.

The business operation situation information creating part 104 next registers the values obtained for the processing target business system ID in Steps S204 to S207 and the date/time of creation in the business operation situation information 115 of FIG. 12 (Step S208).

The business operation situation information creating part 104 then returns to Step S202 and, in the case where executing Steps S203 to S207 has been finished for every business system ID obtained in Step S201, ends the business operation situation information creating processing. In the case where executing Steps S203 to S207 has not been finished for every business system ID obtained in Step S201, the business operation situation information creating part 104 selects, as a new processing target business system ID, a business system ID for which Steps S203 to S207 have not been executed, and executes Steps S203 to S207.

FIG. 17 is a flow chart of the business adequacy ratio calculating processing according to the first embodiment. The business adequacy ratio calculating processing is executed by the business adequacy ratio calculating part 102.

The business adequacy ratio calculating part 102 first refers to the business adequacy ratio definition information 111 of FIG. 4 to obtain the CPU adequacy ratios, memory adequacy ratios, and disk adequacy ratios of the virtual machine templates obtained in Step S203 (Step S401). For example, for the virtual machine template ID "Web server 2" obtained in Step S203, "50" is obtained as the CPU adequacy ratio, "60" is obtained as the memory adequacy ratio, and "50" is obtained as the disk adequacy ratio.

Based on the utilization ratios of the respective resources which are included in the business capacity utilization information 114 obtained in Step S205 and on the adequacy ratios of the respective resources obtained in Step S401, the business adequacy ratio calculating part 102 calculates an adequacy deviation degree for each resource for each virtual machine template ID obtained in Step S203, and calculates the adequacy deviation degree of the business system (Step S402). The adequacy deviation degree of a resource indicates the degree of deviation from an adequate utilization ratio of the resource. Expression 1, for example, is used to calculate an adequacy deviation degree for each resource for each virtual machine template ID.

(Resource-by-resource adequacy deviation degree)={((resource-by-resource utilization ratio)−(resource-by-resource adequacy ratio))/(resource-by-resource adequacy ratio)}×100   (Expression 1)

For instance, the CPU adequacy deviation degree of the virtual machine template ID "Web server 2" is calculated by Expression 2, the CPU adequacy deviation degree of the virtual machine template ID "App server 2" is calculated by Expression 3, and the CPU adequacy deviation degree of the virtual machine template ID "DB server 2" is calculated by Expression 4.

(CPU adequacy deviation degree of "Web server 2")={(10−50)/50}×100=−80   (Expression 2)

(CPU adequacy deviation degree of "App server 2")={(35−50)/50}×100=−30   (Expression 3)

(CPU adequacy deviation degree of "DB server 2")={(50−50)/50}×100=0   (Expression 4)

The business adequacy ratio calculating part 102 compares, for each resource, the adequacy deviation degrees of the respective virtual machines, and sets the adequacy deviation degree whose absolute value is largest as the business system's adequacy deviation degree of the resource. In the example given above, for instance, the CPU adequacy deviation degree "−80" of the "Web server 2" has the largest absolute value, and the CPU adequacy deviation degree of the business system is therefore "−80". The business system's CPU adequacy deviation degree, memory adequacy deviation degree, and disk adequacy deviation degree are calculated in this manner in Step S402.

The resource-by-resource adequacy deviation degrees of the business system may be calculated by other methods. For instance, an average value may be calculated for adequacy deviation degrees of virtual machines with respect to a resource to be used as the business system's adequacy deviation degree of the resource. Alternatively, a weight set to each virtual machine type and adequacy deviation degrees of virtual machines with respect to a resource may be used for the calculation. A variance value, a standard deviation, or the like may be calculated through statistical processing by utilizing past capacity utilization history information or the like, to be used for the resource-by-resource adequacy deviation degrees of the business system. The business characteristics information 121 of FIG. 8 may also be referred to so that the characteristics of the business system are taken into account in the calculation of the business system's adequacy deviation degree with respect to a resource. For instance, characteristics that give priority to the CPU and the memory are registered for a business system where a large CPU capacity and a large memory capacity are consumed and there is substantially no input/output in the disk device. In this case, adequacy deviation degrees may be calculated only for the resources that are given priority out of the resource-by-resource adequacy deviation degrees of the business system, or a varying weight may be set to the resource-by-resource adequacy deviation degrees of the business system so that a weight set to the adequacy deviation degrees of the resources that are given priority is heavier than the one set to the adequacy deviation degrees of resources that are not given priority.

The business adequacy ratio calculating part 102 next calculates the business adequacy ratio of the business system based on the business system's adequacy deviation degrees calculated for the respective resources in Step S402 (Step S403), and ends the processing. The business adequacy ratio indicates the overall adequacy deviation degree of a business system. The business adequacy ratio is calculated by, for example, Expression 5.

(Business adequacy ratio)=100−(absolute value of resource adequacy deviation degree that has the largest absolute value among resource-by-resource adequacy deviation degrees of the business system)   (Expression 5)

In the case where the business system ID is "business system A", for example, the CPU adequacy deviation degree "−80" has the largest absolute value among the adequacy deviation degrees of the respective resources, and the business adequacy deviation degree of the business system A is therefore calculated as "100−80=20".

The calculation of the business adequacy ratio is not limited to this method. Other methods include using as the business adequacy ratio an average value or sum value of the business system's resource-by-resource adequacy deviation degrees, and using past history information of other business systems in the calculation. The business adequacy deviation degree may be calculated also by referring to the business characteristics information 121 of FIG. 8 and weighting the resource-by-resource adequacy deviation degrees accordingly.

FIG. 18 is a flow chart of the charged amount calculating processing according to the first embodiment. The charged amount calculating processing is executed by the charged amount calculating part 103.

The charged amount calculating part 103 first obtains the charging definition information 113 of FIG. 5 (Step S501). The charged amount calculating part 103 then refers to the virtual machine template information 112 of FIG. 7 to obtain resource capacities and other types of information that are associated with the virtual machine template IDs obtained in Step S203 (Step S502). Specifically, the charged amount calculating part 103 obtains, from records of the virtual machine template information 112 where the virtual machine template IDs obtained in Step S203 are registered as the virtual machine template ID 701, information registered as the CPU 702, the memory 703, the disk capacity 704, and the disk type 705.

Based on the business capacity utilization information 114 obtained in Step S205, the charging definition information 113 obtained in Step S501, and the information obtained in Step S502, the charged amount calculating part 103 calculates an amount that is charged for the business system identified by the processing target business system ID (Step S503), and ends the processing. In the charging definition information 113, metered charging is registered as the charging method 503 for the CPU and the memory, and fixed charging is registered as the charging method 503 for the disk (SSD). Therefore, when the processing target business system ID is "business system A", the CPU charged amount and memory charged amount of the virtual machine template ID "Web server 2" are each calculated by multiplying the allocated amount, the unit charging price, and the running time (see Expression 6 and Expression 7), and the disk charged amount of the virtual machine template ID "Web server 2" is calculated by multiplying the allocated amount and the unit charging price (see Expression 8).

(CPU charged amount)=(CPU allocated amount)× (unit charging price)×(running×(running time) =2×10×350=7,000 (Expression 6)

(Memory charged amount)=(memory allocated amount)×(unit charging price)×(running×(running time)=2×10×350=3,500 (Expression 7)

(Disk charged amount)=(disk allocated amount)× (unit charging price)×(running×(running time) =20×50=1,000 (Expression 8)

These charged amounts are added up to calculate the charged amount of the virtual machine template ID "Web server 2" (see Expression 9).

(Charged amount of Web server 2)=(CPU charged amount)+(memory charged amount)+(disk charged amount)=11,500 (Expression 9)

For each of the virtual machine template IDs "App server 2" and "DB server 2", too, the charged amount of the virtual machine is calculated by calculating a charged amount for each resource and adding up the charged amounts of the respective resources.

The charged amounts of the virtual machines constructing the business system A (the Web server 2, the App server 2, and the DB server 2) are then added up, to thereby calculate the charged amount of the business system A.

FIG. 19 is a flow chart of the business operation situation information drawing processing according to the first embodiment. The business operation situation information drawing processing is executed by the business operation situation drawing part 108.

The business operation situation drawing part 108 obtains the business operation situation information 115 of FIG. 12 (Step S601) and obtains the drawing definition information 120 of FIG. 14 (Step S602).

The business operation situation drawing part 108 next selects, as a processing target business system ID, one business system ID for which Steps S604 to S607 have not been executed from business system IDs that are registered as the business ID 1201 in the business operation situation information 115 obtained in Step S601 (Step S603), and executes Steps S604 to S607 for the selected processing target business system ID. In the case where executing Steps S604 to S607 has been finished for every business system ID that is registered as the business ID 1201 in the business operation situation information 115 obtained in Step S601, the processing proceeds to Step S608.

The business operation situation drawing part 108 first obtains, from a record of the business operation situation information 115 where the processing target business system ID is registered as the business ID 1201, a business adequacy ratio registered as the business adequacy ratio 1202, and determines a coordinate point x on the horizontal axis based on the obtained business adequacy ratio (Step S604).

The business operation situation drawing part 108 next obtains, from the record of the business operation situation information 115 where the processing target business system ID is registered as the business ID 1201, a charged amount registered as the charged amount 1206, and determines a coordinate point y on the vertical axis based on the obtained charged amount (Step S605).

The business operation situation drawing part 108 next obtains, from the record of the business operation situation information 115 where the processing target business system ID is registered as the business ID 1201, a running cost registered as the running cost 1207, and determines a circle diameter r based on the obtained running cost (Step S606). When a circle that has a diameter equal to or more than a given value is displayed on the operation situation displaying screen 2000 of FIG. 20, the administrator or others have a difficulty in grasping the operation situations of the respective business systems. The administrator or others may therefore set a maximum diameter r in advance so that the diameter of a circle for a business system whose running cost is equal to or more than the maximum diameter r is determined as the maximum diameter r.

The business operation situation drawing part 108 next obtains a drawing rule of the processing target business system ID from the drawing definition information 120 obtained in Step S602, and determines a drawing color c based on the obtained drawing rule (Step S607).

When executing Steps S604 to S607 is finished for every business system ID that is registered as the business ID 1201 in the business operation situation information 115 obtained in Step S601, and coordinate points on the horizontal axis and the vertical axis, the circle diameter, and the drawing color have been determined for every business system, the business operation situation drawing part 108 draws the operation situation displaying screen 2000 illustrated in FIG. 20 where a circle having the diameter r is displayed in the drawing color c at the coordinate points (x, y) on the horizontal axis and the vertical axis (Step S608), and ends the processing. If a circle with a small diameter is drawn so as to be hidden behind a circle with a large diameter on the business operation situation displaying screen 2000, the administrator or others may fail to notice the small-diameter circle. The business operation situation drawing part 108 may therefore draw the business operation situation displaying screen 2000 in a manner that puts a circle having a larger diameter r at the back with respect to the respective circles.

FIG. 20 is an explanatory diagram of the operation situation displaying screen 2000 according to the first embodiment.

The operation situation displaying screen 2000 of FIG. 20 displays the operation situation (business adequacy ratio, charged amount, and running cost) of a business system in the form of a bubble chart. Specifically, the business adequacy ratio is set as the horizontal axis of the operation situation displaying screen 2000, the charged amount is set as the vertical axis, and the running cost is set as the diameter of a bubble in the bubble chart. Which of the business adequacy ratio, the charged amount, and the running cost is set as which of the horizontal axis, the vertical axis, and the bubble diameter may be determined at one's discretion.

When the business adequacy ratio is set as the horizontal axis and the charged amount is set as the vertical axis as in the operation situation displaying screen 2000 of FIG. 20, a bubble placed farther from the origin along the horizontal axis and the vertical axis both indicates that a business system represented by the bubble is in a better operation situation. The administrator can thus instinctively grasp the operation situation of a business system simply by glancing at the location of the relevant bubble on the operation situation displaying screen 2000. In the case where the running cost is set as the horizontal axis or the vertical axis, the business adequacy ratio or the charged amount is set as the other axis which is not the one where the running cost is set. To the administrator, a greater business adequacy ratio or charged amount is a better business system operation situation and a lower running cost is a better business system operation situation. Accordingly, the operation situation of a business system is better at a point closer to the origin along the axis where the running cost is set, and is better at a point farther from the origin along the axis where the business adequacy ratio or the charged amount is set. This makes it difficult for the administrator to grasp the operation situation of a business system.

A bubble indicating the operation situation of a business system is desirably displayed in an expression that makes the bubble distinguishable from another bubble. In this embodiment, a drawing color is defined for each business system in the drawing definition information 120 of FIG. 14 so that a bubble is displayed in an expression distinguishable from that of another bubble. Displaying a bubble in an expression that makes the bubble distinguishable from another bubble may be accomplished by other methods. For instance, the business operation situation drawing part 108 may manage the drawing colors of bubbles so that the bubbles are displayed in colors different from one another, or an icon by which a business system can be identified may be superimposed on the displayed bubble.

The operation situation displaying screen 2000 of FIG. 20 includes a search field 2001 so that, when the administrator or others enters information by which a business system can be identified (e.g., a business system name) in the search field 2001, a business system associated with the entered business system ID can be identified. The identification of a business system by the administrator or others is not limited to this method. For instance, a business system name or an icon representing a business system may be displayed at each bubble so that, by clicking on the business system name or the icon, a business system associated with the clicked business system name or icon is identified. Alternatively, a list of business system names may be displayed near the bubble chart to let the administrator select a business system name on the list, or a tree showing the overall configuration of business systems may be displayed near the bubble chart to let the administrator select a business system.

The management computer 1 can thus calculate an operation situation for each business system that is currently in operation, and display the calculated operation situation of the business system.

Processing up to the display of the amelioration plan displaying screen 2600 is described with reference to FIGS. 21 to 26.

Figure 21:
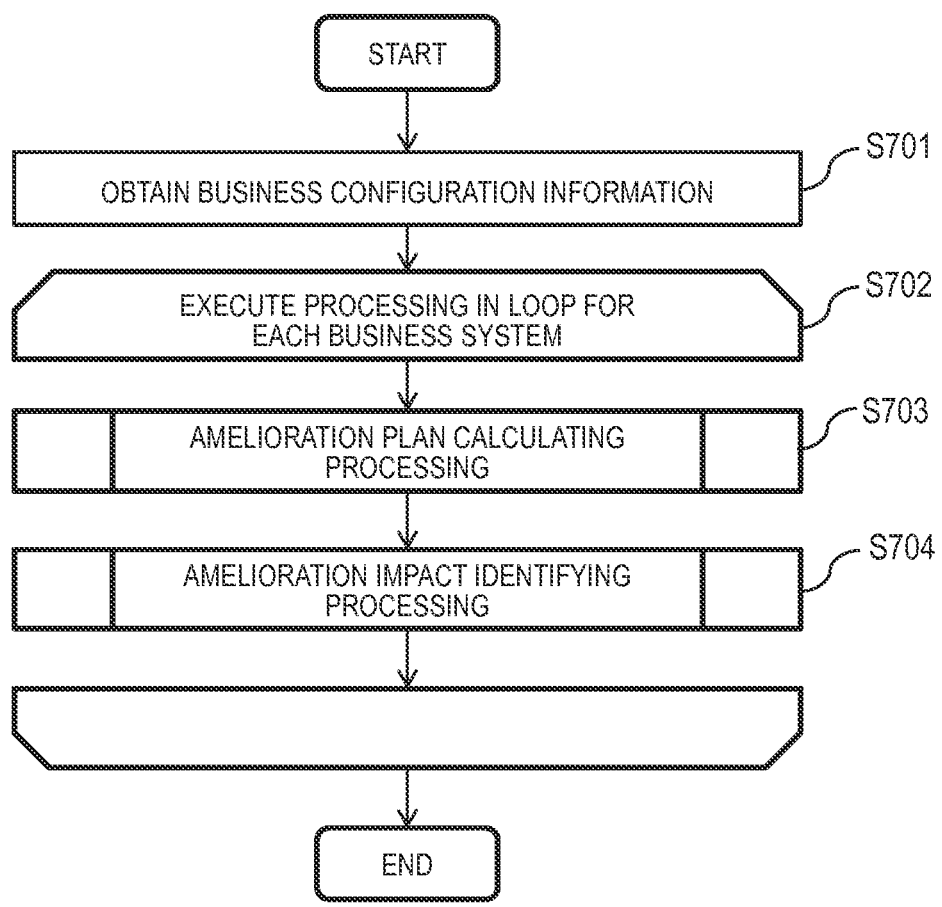
FIG. 21 is a flow chart of amelioration plan information creating processing according to the first embodiment.

FIG. 21 is a flow chart of the amelioration plan information creating processing according to the first embodiment. The amelioration plan information creating processing is executed by the amelioration plan calculating part 105.

The amelioration plan calculating part 105 first refers to the business configuration information 117 of FIG. 10 to obtain the IDs of business systems that are currently in operation (Step S701).

The amelioration plan calculating part 105 selects one business system ID that is a processing target from the business system IDs obtained in Step S701 (Step S702), executes Steps S703 and S704, and, when finishing executing Steps S703 and S704 for every business system ID obtained in Step S701, ends the amelioration plan information creating processing.

The amelioration plan calculating part 105 executes amelioration plan calculating processing for calculating an amelioration plan for the processing target business system ID (Step S703). Details of the amelioration plan calculating processing are described with reference to FIGS. 22 and 23.

The amelioration plan calculating part 105 next executes amelioration effect identifying processing for identifying a business system that is affected by the amelioration plan calculated in Step S703 (Step S704). In the case where executing Steps S703 and S704 has been finished for every business system ID obtained in Step S701, the processing is ended. In the case where executing Steps S703 and S704 has not been finished for every business system ID obtained in Step S701, the amelioration plan calculating part 105 returns to Step S702 to select a new processing target business system ID. Details of the amelioration effect identifying processing are described with reference to FIG. 24.

FIG. 22 is a flow chart of the amelioration plan calculating processing according to the first embodiment.

The amelioration plan calculating part 105 first refers to the system template information 116 of FIG. 6 to obtain the template type and level of the business system identified by the processing target business system ID (Step S801). Specifically, the amelioration plan calculating part 105 obtains, from a record of the business configuration information 117 of FIG. 10 where the processing target business system ID is registered as the business system ID 1001, identification information registered as the system template ID 1002 (a system template ID). The amelioration plan calculating part 105 then obtains, from a record of the system template information 116 where the system template ID of the processing target business system is registered as the system template ID 601, information registered as the system template type 602 and information registered as the level 603.

When the processing target business system ID is "business system A", for example, the system template ID is "3" and information obtained from the system template information 116 is a template type "Web system" and a level "3".

The amelioration plan calculating part 105 next determines a resource for which amelioration is to be made based on an operation situation that is associated with the processing target business system ID in the business operation situation information 115 of FIG. 12 (Step S802). For example, the amelioration plan calculating part 105 determines, as an amelioration target resource, a resource that has the largest adequacy deviation degree in absolute value among the resource-by-resource adequacy deviation degrees of the processing target business system ID. When the processing target business system ID is "business system A", for example, reference to the business operation situation information 115 of FIG. 12 reveals that the adequacy deviation degree that has the largest absolute value is the CPU adequacy deviation degree, and the amelioration plan calculating part 105 therefore determines the CPU as an amelioration target resource.

Other methods may be used to determine an amelioration target resource. For instance, the amelioration plan calculating part 105 may refer to the business characteristics information 121 of FIG. 8 to determine as an amelioration target resource a resource that is given priority in the processing target business system.

The amelioration plan calculating part 105 next determines system templates that are candidates for use in amelioration based on the value of the adequacy deviation degree of the amelioration target resource (Step S803).

For example, when Expression 1 is used to calculate an adequacy deviation degree for each resource for each virtual machine, a positive value of the adequacy deviation degree of the amelioration target resource indicates that the utilization ratio of this resource exceeds its adequate utilization ratio. The amelioration plan calculating part 105 therefore determines as an amelioration candidate system template a system template whose level is higher than the level of the system template that is currently used by the business system identified by the processing target business system ID (a system template that is larger in allocated resource capacity than the currently used system template). The business system identified by the processing target business system ID can thus have a utilization ratio closer to the adequate utilization ratio of the amelioration target resource.

A negative value of the adequacy deviation degree of the amelioration target resource, on the other hand, indicates that the utilization ratio of this resource is below its adequate utilization ratio. The amelioration plan calculating part 105 therefore determines as an amelioration candidate system template a system template whose level is lower than the level of the system template that is currently used by the business system identified by the processing target business system ID (a system template that is smaller in allocated resource capacity than the currently used system template). The business system identified by the processing target business system ID can thus have a utilization ratio closer to the adequate utilization ratio of the amelioration target resource.

When the processing target business system ID is "business system A", for example, the amelioration target resource is the CPU and the CPU adequacy deviation degree is "−80". The amelioration plan calculating part 105 in this case determines as an amelioration candidate system template every "Web system"-type system template whose level is lower than the level "3" of the system template "3" (in FIG. 6, system template "4"), which is currently used by the business system A.

In the case where amelioration candidate system templates cannot be selected, such as when there is no system template whose level is higher than that of the system template currently used by the business system, the amelioration plan calculating part 105 may notify the administrator of the need to create a new system template. The amelioration plan calculating part 105 in this case may automatically create a new system template which is increased in the resource capacity allocated to virtual machine templates constructing the currently used system template, or may automatically create a new system template based on an existing capacity planning technology and the past capacity utilization history information of the business system.

The amelioration plan calculating part 105 next selects an amelioration candidate system template that is a processing target (processing target amelioration candidate system template) from the amelioration candidate system templates determined in Step S803 (Step S804), executes Steps S805 to S808, and, when finishing executing Steps S805 to S808 for every amelioration candidate system template determined in Step S803, ends the processing.

The amelioration plan calculating part 105 first refers to the system template information 116 of FIG. 6 to obtain identification information of a virtual machine template (a virtual machine template ID) for each of virtual machine templates constructing the currently used system template (Step S805). Specifically, the amelioration plan calculating part 105 obtains, from a record of the system template information 116 where the system template ID that is being used by the business system identified by the business system ID selected in Step S702 is registered as the system template ID 601, virtual machine template IDs registered as the virtual machine A 604 to the virtual machine D 607.

The amelioration plan calculating part 105 next executes expected adequacy ratio calculating processing for calculating an expected adequacy deviation degree for each resource of the processing target amelioration candidate system template and an expected business adequacy ratio of the processing target amelioration candidate system template (Step S806). In the expected adequacy ratio calculating processing, an expected charged amount and expected running cost of the processing target amelioration candidate system template are calculated as well. Details of the expected adequacy ratio calculating processing are described with reference to FIG. 23.

The amelioration plan calculating part 105 next refers to the platform capacity information 118 of FIG. 9 to determine for each resource whether or not the capacity allocated when a business system is built with the use of the processing target amelioration candidate system template exceeds the full capacity of the resource (Step S807).

Specifically, the amelioration plan calculating part 105 calculates amounts by which the expected CPU usage, expected memory usage, and expected disk usage of the processing target amelioration candidate system template increase/decrease from the CPU usage, memory usage, and disk usage of the currently used system template. The increased/decreased amounts of the CPU, the memory, and the disk are added to the allocated capacities of the CPU, the memory, and the disk in the platform capacity information 118 of FIG. 9. The amelioration plan calculating part 105 then determines whether or not the resultant values of the addition exceed the respective full capacities. The CPU usage, memory usage, and disk usage of the currently used system template are calculated by the same method that is used in Step S902 of FIG. 23, and details of the method are described with reference to FIG. 23. The expected CPU usage, expected memory usage, and expected disk usage of the processing target amelioration candidate system template are calculated by the same method that is used in Step S903 of FIG. 23, and details of the method are described with reference to FIG. 23.

The amelioration plan calculating part 105 also calculates an amount by which the running cost of the processing target amelioration candidate system template increases/decreases from the running cost of the currently used system template, and adds the increased/decreased amount to the allocated capacity 903 of the running cost in the platform capacity information 118 of FIG. 9. The amelioration plan calculating part 105 then determines whether or not the resultant value of the addition exceeds the full capacity 902. The running cost of a system template is calculated by the amelioration plan calculating part 105 by obtaining running costs of virtual machine templates constructing the system template from the running cost definition information 110 of FIG. 3, and adding up the obtained running costs.

In the case where it is determined in Step S807 for every resource that the capacity allocated when a business system is built with the use of the processing target amelioration candidate system template does not exceed the full capacity of the resource, the amelioration plan calculating part 105 registers the expected business adequacy ratio of the processing target amelioration candidate system template, the expected adequacy deviation degrees of the respective resources, and the like in the amelioration plan information 119 of FIG. 13 (Step S808), and returns to Step S804.

In the case where it is determined in Step S807 for at least one resource that the capacity allocated when a business system is built with the use of the processing target amelioration candidate system template exceeds the full capacity of the resource, on the other hand, this processing target amelioration candidate system template is unsuitable as an amelioration plan, and the amelioration plan calculating part 105 therefore returns to Step S804 without executing Step S808.

Figure 23:
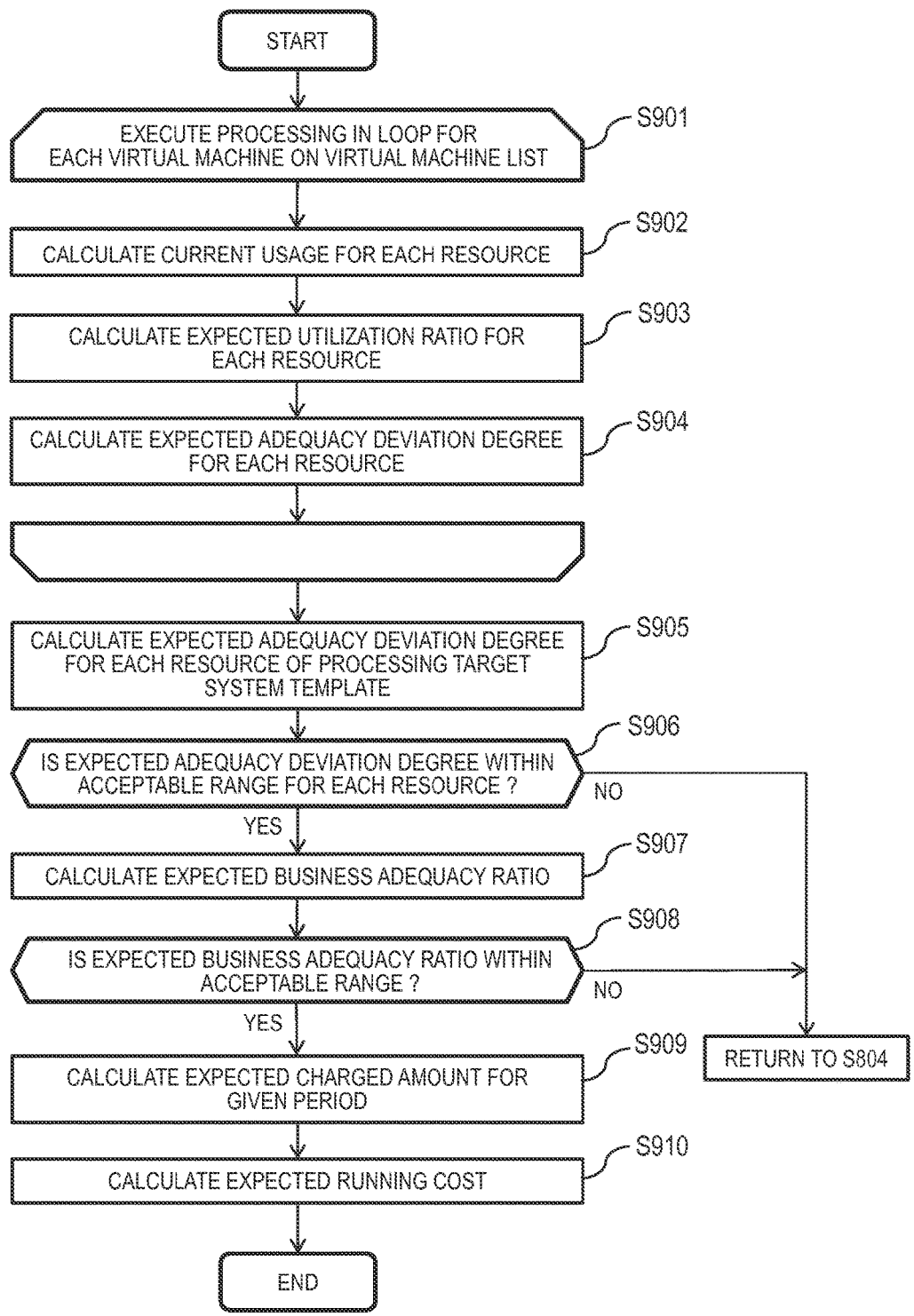
FIG. 23 is a flow chart of expected adequacy ratio calculating processing according to the first embodiment.

FIG. 23 is a flow chart of the expected adequacy ratio calculating processing according to the first embodiment. The expected adequacy ratio calculating processing which is executed by the amelioration plan calculating part 105 in this embodiment may instead be executed by the business adequacy ratio calculating part 102.

The amelioration plan calculating part 105 first selects a virtual machine template ID that is a processing target from the virtual machine template IDs obtained in Step S805 (Step S901), and executes Steps S902 to S904.

The amelioration plan calculating part 105 calculates the current usage for each resource (Step S902). Specifically, the amelioration plan calculating part 105 refers to the business capacity utilization information 114 of FIG. 11 that is associated with the processing target business system ID selected in Step S702 to obtain the CPU utilization ratio, memory utilization ratio, disk utilization ratio, and running time of a virtual machine that is identified by the processing target virtual machine template ID. The amelioration plan calculating part 105 also obtains from the virtual machine template information 112 of FIG. 7 a CPU capacity, a memory capacity, and a disk capacity that are allocated to a virtual machine template identified by the processing target virtual machine template ID, and the disk type of the virtual machine template. The amelioration plan calculating part 105 then calculates, for each resource, the current usage of the resource by multiplying the utilization ratio of the resource by the capacity of the resource.

How to achieve the calculation for each resource of a virtual machine "Web-VM", which is one of virtual machines constructing the business system A, is described as an example. The virtual machine "Web-VM" is built with the use of the virtual machine template "Web server 2". The business capacity utilization information 114 of FIG. 11 is referred to, and the CPU utilization ratio "10%", memory utilization ratio "70%", and disk utilization ratio "45" of the virtual machine "Web-VM" are obtained. The virtual machine template information 112 of FIG. 7 is referred to, and the CPU capacity "3 GHz", memory capacity "2 GB", and disk capacity "20 GB" of the virtual machine template "Web server 2" are obtained.

(CPU usage)=(CPU utilization ratio)×(CPU capacity)
 =0.1×3=0.3[GHz]

(Memory usage)=(memory utilization ratio)×
 (memory capacity)=0.7×2=1.4 [GB]

The disk utilization ratio is not multiplied by the disk capacity and the current disk utilization ratio is used as the disk usage as it is because the disk utilization ratio is in the units of IOPS.

(Disk usage)=(current IOPS value)=45 [IOPS]

The amelioration plan calculating part 105 next calculates, for each resource, a utilization ratio that is expected in the processing target virtual machine template when the processing target amelioration candidate system template is applied (Step S903).

Specifically, the amelioration plan calculating part 105 obtains, from the system template information 116 of FIG. 6, a virtual machine template ID that corresponds to the processing target virtual machine template ID (a processing target amelioration candidate virtual machine template ID) out of the IDs of virtual machine templates constructing the processing target amelioration candidate system template. A processing target amelioration candidate virtual machine template ID is the virtual machine template ID of a virtual machine template from which a virtual machine of the same type as the one identified by the processing target virtual machine template ID is built. For instance, "Web server 1" and "Web server 3" are processing target amelioration candidate virtual machine template IDs of "Web server 2". The amelioration plan calculating part 105 then refers to the virtual machine template information 112 of FIG. 7 to obtain a CPU capacity, a memory capacity, and a disk capacity that are allocated to a virtual machine template identified by the obtained processing target amelioration candidate virtual machine template ID, and the disk type of the virtual machine template. The amelioration plan calculating part 105 calculates for each resource the expected utilization ratio of the processing target virtual machine template by dividing the usage of the resource which has been calculated in Step S902 by the obtained capacity of the resource.

For example, in the case where an amelioration candidate system template of the business system A has a system template ID "4" and a processing target virtual machine template out of virtual machine templates constructing the system template "3" of the business system A has a virtual machine template ID "Web server 2", reference to the system template information of FIG. 6 reveals that the ID of a virtual machine template that corresponds to the processing target virtual machine template ("Web server 2") out of virtual machine templates constructing the system template "4" is "Web server 3". A resource utilization ratio that is expected when the Web server 3 is used to build a virtual machine instance (Web-VM 3) is calculated for each resource as follows.

(Expected CPU utilization ratio)=(current CPU usage)/(CPU structure of Web server 3)=0.3/ 1=30%

(Expected memory utilization ratio)=(current memory usage)/(CPU structure of Web server 3)=1.4/2=70%

The expected disk utilization ratio is the same as the current value because the disk type is the same.

The amelioration plan calculating part 105 next refers to the business adequacy ratio definition information 111 of FIG. 4 to obtain, for each resource, an adequacy ratio that is associated with the processing target amelioration candidate virtual machine template ID. Based on the expected utilization ratio calculated for each resource in Step S903 and on the adequacy ratio obtained for each resource, the amelioration plan calculating part 105 calculates for each resource the expected adequacy deviation degree of the virtual machine identified by the processing target virtual machine template ID (904), and returns to Step S901.

In the case where one of amelioration candidate system templates of the business system A has a system template ID "2", for example, the expected adequacy deviation degree of Web-VM 3 is calculated, as follows, for each resource with the use of the expected utilization ratios of the respective resources which have been calculated in Step S903 and Expression 1.

(Expected CPU adequacy deviation degree)={(30− 50)/50}=−40

(Expected memory adequacy deviation degree)={ (70−60)/60}=17

(Expected disk adequacy deviation degree)={(45− 50)/50}=−10

By executing Steps S901 to S904, an adequacy deviation degree that is expected when an amelioration candidate system template is applied can be calculated for each resource and for each virtual machine.

After the adequacy deviation degrees of the respective resources that are expected when the processing target amelioration candidate system template is applied are calculated for every virtual machine template, the amelioration plan calculating part 105 calculates for each resource the adequacy deviation degree of the processing target amelioration candidate system template (Step S905). Specifically, the amelioration plan calculating part 105 sets, for each resource, as the adequacy deviation degree of the processing target amelioration candidate system template with respect to the resource, an expected adequacy deviation degree that has the largest absolute value among the expected adequacy deviation degrees of the respective virtual machine templates which have been calculated for the resource in Step S904.

The amelioration plan calculating part 105 next determines whether or not the adequacy deviation degree of the processing target amelioration candidate system template that has been calculated for each resource in Step S905 is within an acceptable range (Step S906). For instance, in the case where one of the expected adequacy deviation degrees of the respective resources of the processing target amelioration candidate system template is worse than the adequacy deviation degree of the resource of the current business system template, the amelioration plan calculating part 105 may determine that the adequacy deviation degrees of the respective resources of the processing target amelioration candidate system template are outside an acceptable range. Alternatively, the administrator may set acceptable range information for each resource in advance. The amelioration plan calculating part 105 in this case may determine that the adequacy deviation degrees of the respective resources of the processing target amelioration candidate system template are within an acceptable range when, for example, it is confirmed for each resource that the difference between the expected adequacy deviation degree of the resource and the current adequacy deviation degree of the resource is within a given range. In still another method, the amelioration plan calculating part 105 may refer to the business characteristics information 121 of FIG. 8 to obtain information about a resource that is given priority and, when the expected adequacy deviation degree of the resource for which the information has been obtained out of resources of the amelioration candidate system template is worse than the adequacy deviation degree of the resource of the current business system template, determine that the adequacy deviation degrees of the respective resources of the processing target amelioration candidate system template are outside an acceptable range.

When it is determined in Step S906 that the adequacy deviation degrees of the respective resources of the processing target amelioration candidate system template are outside an acceptable range, this processing target amelioration candidate system template is unsuitable as an amelioration plan, and the processing returns to Step S804.

When it is determined in Step S906 that the adequacy deviation degrees of the respective resources of the processing target amelioration candidate system template are within an acceptable range, on the other hand, the amelioration plan calculating part 105 calculates the expected business adequacy ratio of the processing target amelioration candidate system template based on the adequacy deviation degree of the processing target amelioration candidate system template that has been calculated for each resource in Step S905 (Step S907). The expected business adequacy ratio is calculated by, for example, Expression 5, which has been described with reference to FIG. 17. For instance, when an amelioration candidate system template of the business system A has a system template ID "4" and the expected CPU adequacy deviation degree is the largest in absolute value at "−40" among the expected adequacy deviation degrees of the respective resources, the expected business adequacy ratio is calculated as follows.

(Expected business adequacy ratio)=100−40=60

The amelioration plan calculating part 105 next determines whether or not the expected business adequacy ratio that has been calculated in Step S907 is within an acceptable range (Step S908). For example, when a comparison between the current business adequacy ratio of the business system and the expected business adequacy ratio of the processing target amelioration candidate system template shows that the expected business adequacy ratio is poorer (lower) than the current business adequacy ratio, or that the increase from the current business adequacy ratio to the expected business adequacy ratio is not equal to or more than a given value, the amelioration plan calculating part 105 may determine that the expected business adequacy ratio that has been calculated in Step S907 is outside an acceptable range on the account that amelioration made by the processing target amelioration candidate system template is not much effective.

When it is determined in Step S908 that the expected business adequacy ratio is outside an acceptable range, the processing target amelioration candidate system template is unsuitable as an amelioration plan, and the processing returns to Step S804.

When it is determined in Step S908 that the expected business adequacy ratio is within an acceptable range, on the other hand, the amelioration plan calculating part 105 refers to the charging definition information 113 of FIG. 5 to calculate a charged amount that is expected for a given period when the processing target amelioration candidate system template is applied (Step S908). The given period may be a fixed period (e.g., a month) that is set by the administrator, or may be the running time of the processing target business system which is obtained from the business capacity utilization information 114 of FIG. 11. The charged amount calculating part 103 may execute Step S908 instead.

A detailed calculation method of the expected charged amount is the same as the charged amount calculating processing of FIG. 18, and a description thereof is therefore omitted here.

The amelioration plan calculating part 105 next refers to the running cost definition information 110 of FIG. 3 to calculate the expected running cost of the amelioration candidate system template (Step S909), and ends the processing. A detailed calculation method of the expected running cost is the same as in Step S204 of FIG. 18, and a description thereof is therefore omitted here.

FIG. 24 is a flow chart of the amelioration effect identifying processing according to the first embodiment.

The amelioration plan calculating part 105 first refers to the amelioration plan information 119 of FIG. 13 to obtain a list of amelioration plans that are associated with the processing target business system ID (Step S1001).

The amelioration plan calculating part 105 next selects an amelioration plan that is a processing target from the amelioration plan list obtained in Step S1001 (Step S1002), and executes Steps S1003 to S1005.

The amelioration plan calculating part 105 refers to the system template information 116 of FIG. 6 to obtain the IDs of virtual machine templates constructing a system template of the processing target amelioration plan (Step S1003). Specifically, the amelioration plan calculating part 105 obtains, from a record of the amelioration plan information 119 of FIG. 13 where amelioration plan identification information (an amelioration plan ID) of the processing target amelioration plan is registered as the amelioration plan ID 1301, information registered as the amelioration plan 1302. Information registered as the amelioration plan 1302 in the amelioration plan information 119 of FIG. 13 is one that indicates the type and level of a system template so that a system template used in an amelioration plan can be identified. The amelioration plan calculating part 105 then refers to the system template information of FIG. 6 to obtain the IDs of virtual machine templates constructing a system template that is identified by the information obtained from the amelioration plan information 119.

Based on the virtual machine template IDs obtained in Step S1003, the amelioration plan calculating part 105 identifies a business system that is affected when the system template of the amelioration plan is applied out of business systems that are currently in operation (Step S1004). For instance, when a computer where a virtual machine is built by instantiating a template that is identified by one of the virtual machine template IDs obtained in Step S1003 is the same as a computer where a virtual machine constructing one business system is built, this business system is a business system that is affected. The processing of identifying an affected business system in Step S1004 can use an existing technology such as a virtualization management technology, a resource arrangement technology, or a simulation technology.

The amelioration plan calculating part 105 next registers identification information of the affected business system which has been identified in Step S1004 as the affected business ID 1309 in a record of the amelioration plan information 119 for the processing target amelioration plan (Step S1005). In the case where executing Steps S1003 to S1005 has been finished for every amelioration plan obtained in Step S1001, the processing is ended. In the case where executing Steps S1003 to S1005 has not been finished for every amelioration plan obtained in Step S1001, a new processing target amelioration plan is selected in Step S1002.

FIG. 25 is a flow chart of the amelioration plan information drawing processing according to the first embodiment. The amelioration plan information drawing processing is executed by the amelioration plan drawing part 107.

The amelioration plan drawing part 107 receives an input of the selection of a business system for which an amelioration plan is displayed (Step S1101). Specifically, the selection of a business system for which an amelioration plan is wished to be displayed is input by the administrator or others on the operation situation displaying screen 2000 of FIG. 20, and the amelioration plan drawing part 107 receives the input. The administrator inputs the selection of a business system by a method described above with reference to FIG. 20.

The amelioration plan drawing part 107 refers to the amelioration plan information 119 of FIG. 13 to obtain a list of amelioration plans that are associated with business system identification information (a business system ID) of the business system that is selected in the selection input received in Step S1101 (Step S1102).

The amelioration plan drawing part 107 next selects an amelioration plan that is a processing target from the amelioration plan list obtained in Step S1102 (Step S1103), and executes Steps S1104 to S1108 for the selected amelioration plan. In the case where it is found in Step S1103 that executing Steps S1104 to S1108 has been finished for every amelioration plan on the amelioration plan list obtained in Step S1102, the amelioration plan drawing part 107 proceeds to Step S1108.

The amelioration plan drawing part 107 first obtains, from a record of the amelioration plan information 119 where amelioration plan identification information (an amelioration plan ID) of the processing target amelioration plan is registered as the amelioration plan ID 1301, an expected business adequacy ratio registered as the expected business adequacy ratio 1303, and determines the coordinate point x on the horizontal axis based on the obtained expected business adequacy ratio (Step S1104).

The amelioration plan drawing part 107 next obtains, from a record of the amelioration plan information 119 where the amelioration plan ID of the processing target amelioration plan is registered as the amelioration plan ID 1301, an expected changed amount registered as the expected charged amount 1307, and determines the coordinate point y on the vertical axis based on the obtained expected changed amount (Step S1105).

The amelioration plan drawing part 107 next obtains, from a record of the amelioration plan information 119 where the amelioration plan ID of the processing target amelioration plan is registered as the amelioration plan ID 1301, an expected running cost registered as the expected running cost 1308, and determines a circle diameter r based on the obtained expected running cost (Step S1106). As in Step S606 of the business operation situation drawing processing which is illustrated in FIG. 19, the amelioration plan drawing part 107 may determine a maximum circle diameter value in advance and determine the circle diameter r so that the maximum value is not exceeded.

The amelioration plan drawing part 107 next obtains the drawing rule of the processing target amelioration plan from the drawing definition information 120 of FIG. 14, and determines the drawing color c based on the obtained drawing rule (Step S1107). When an amelioration plan is registered in the amelioration plan information 119 in Step S808 of the amelioration plan calculating processing which is illustrated in FIG. 22, the amelioration plan calculating part 105 determines a drawing rule that includes color information of the amelioration plan, and registers the determined drawing rule and the ID of the amelioration plan in the drawing definition information 120. The drawing rule determined is a drawing rule that includes color information that has not been used in the drawing definition information 120.

When executing Steps S1104 to S1107 is finished for every amelioration plan obtained in Step S1102 and determining coordinate points on the horizontal axis and the vertical axis, the circle diameter, and the drawing color is finished for every amelioration plan of the business system input in Step S1101, the amelioration plan drawing part 107 draws the amelioration plan displaying screen 2600 illustrated in FIG. 26 that displays a circle having the diameter r at the coordinate points (x, y) on the horizontal axis and the vertical axis in the drawing color c (Step S1108), and ends the processing. If a circle with a small diameter is drawn so as to be hidden behind a circle with a large diameter on the amelioration plan displaying screen 2600, the administrator or others may fail to notice the small-diameter circle. The amelioration plan drawing part 107 may therefore draw the amelioration plan displaying screen 2600 in a manner that puts a circle having a larger diameter r at the back with respect to the respective circles. The amelioration plan drawing part 107 may display a circle representing the amelioration plan on the amelioration plan displaying screen 2600 immediately after executing Step S1107.

FIG. 26 is an explanatory diagram of the amelioration plan displaying screen 2600 according to the first embodiment.

The administrator or others selects a bubble of a business system for which an amelioration plan is wished to be displayed from among bubbles of business systems that are displayed on the operation situation displaying screen 2000, by, for example, manipulating a pointer 2610. Receiving an input of the selection, the amelioration plan drawing part 107 executes the amelioration plan information drawing processing of FIG. 25 to display bubbles 2611 to 2613 of amelioration plans for the selected business system. The operation situation displaying screen 2000 that displays the amelioration plan bubbles 2611 to 2613 is referred to as amelioration plan displaying screen 2600.

A bubble of a business system that is selected by the administrator or others is desirably displayed in a manner that makes the bubble distinguishable from a bubble of a business system that is not selected. For instance, a displayed bubble of a selected business system may be highlighted, or a bubble of a business system that is not selected may be drawn in a drawing color lighter than the drawing color of a bubble that represents the selected business system.

The amelioration plan bubbles 2611 to 2613 are desirably displayed in a manner different from that of the bubble that represents the selected business system. For instance, the amelioration plan bubbles 2611 to 2613 may be displayed in a color similar but lighter than the drawing color of the selected business system, or may be displayed in a dotted line.

In this embodiment, before the business system for which the amelioration plan is wished to be displayed is selected by the administrator or others, the amelioration plan information creating processing of FIGS. 21 to 24 is executed to create the amelioration plans for all the business systems currently in operation. Alternatively, when the business system for which the amelioration plan is wished to be displayed is selected by the administrator or others, the amelioration plan information creating processing of FIGS. 21 to 24 may be executed to create the amelioration plan for the business system selected by the administrator or others.

The management computer 1 thus calculates operation situation values (the business adequacy ratio, the charged amount, and the running cost) which indicate the operation situation of a business system, displays the operation situation of the business system, identifies an amelioration plan based on operation situation values (resource adequacy deviation degrees), and displays the amelioration plan. By presenting a suitable amelioration plan to the administrator in this manner, a management system that improves the management efficiency of an administrator is provided.

In addition, in the case where the adequacy deviation degree of a resource indicates that the utilization ratio of the resource is below its adequate utilization ratio, the management computer 1 selects as an amelioration plan a system template that is allocated a smaller resource capacity, and the waste of resources is accordingly reduced. In the case where the adequacy deviation degree of a resource indicates that the utilization ratio of the resource exceeds its adequate utilization ratio, the management computer 1 selects as an amelioration plan a system template that is allocated a larger resource capacity, and a problem due to a shortage of resources can therefore be prevented.

The management computer 1 displays in a bubble chart a business adequacy ratio, a charged amount, and a running cost which indicate the operation situation of a business system, thereby making it easy for the administrator or others to grasp the operation situation of the business system.

The management computer 1 also displays in a bubble chart the expected business adequacy ratio, expected charged amount, and expected cost of an amelioration plan, thereby enabling the administrator or others to know, at a glance, items to be referred to when determining which amelioration plan is to be selected. Deciding on an amelioration plan is thus made easy.

Figure 27:
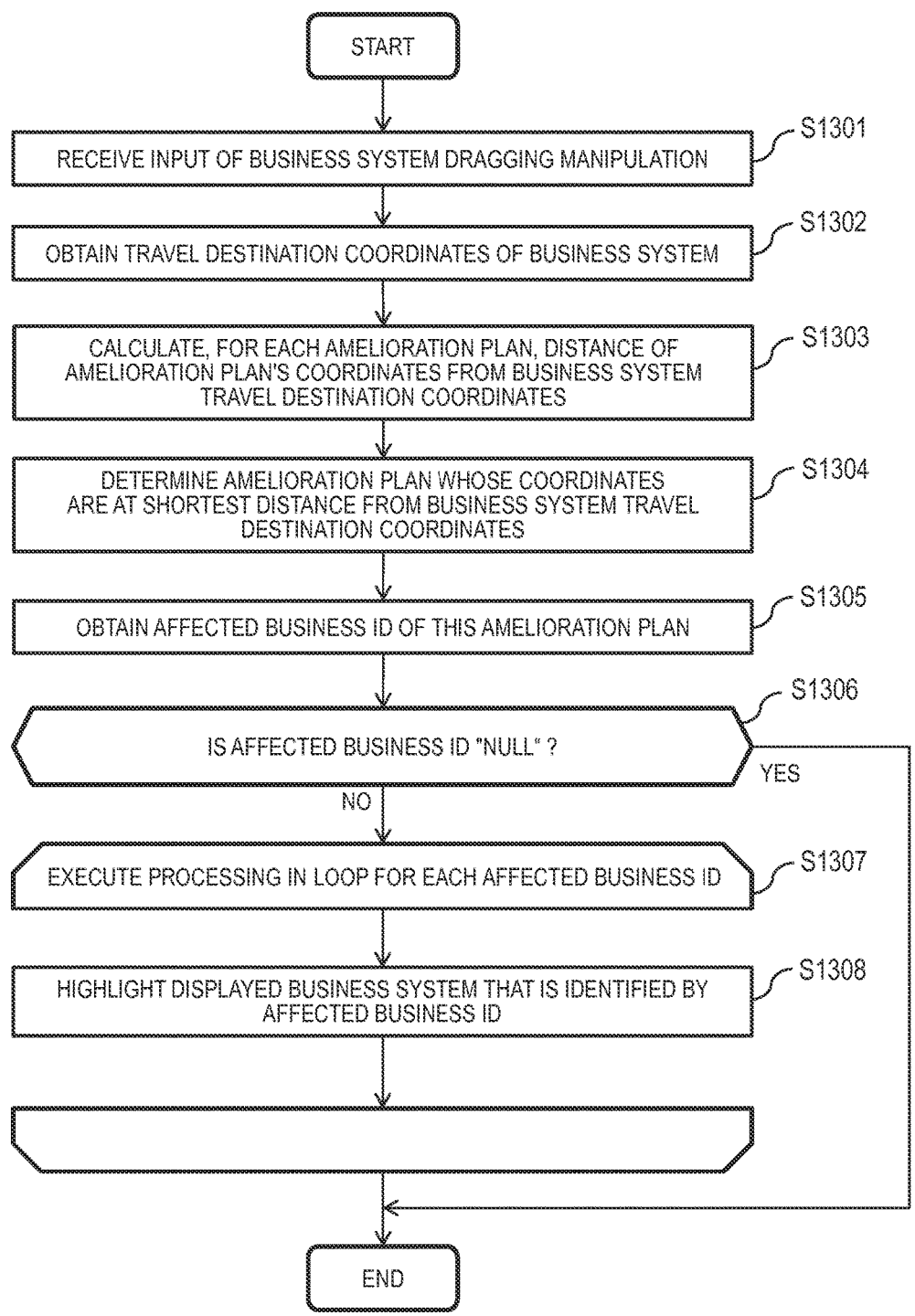
FIG. 27 is a flow chart of affected business drawing processing according to the first embodiment.
Figure 28:
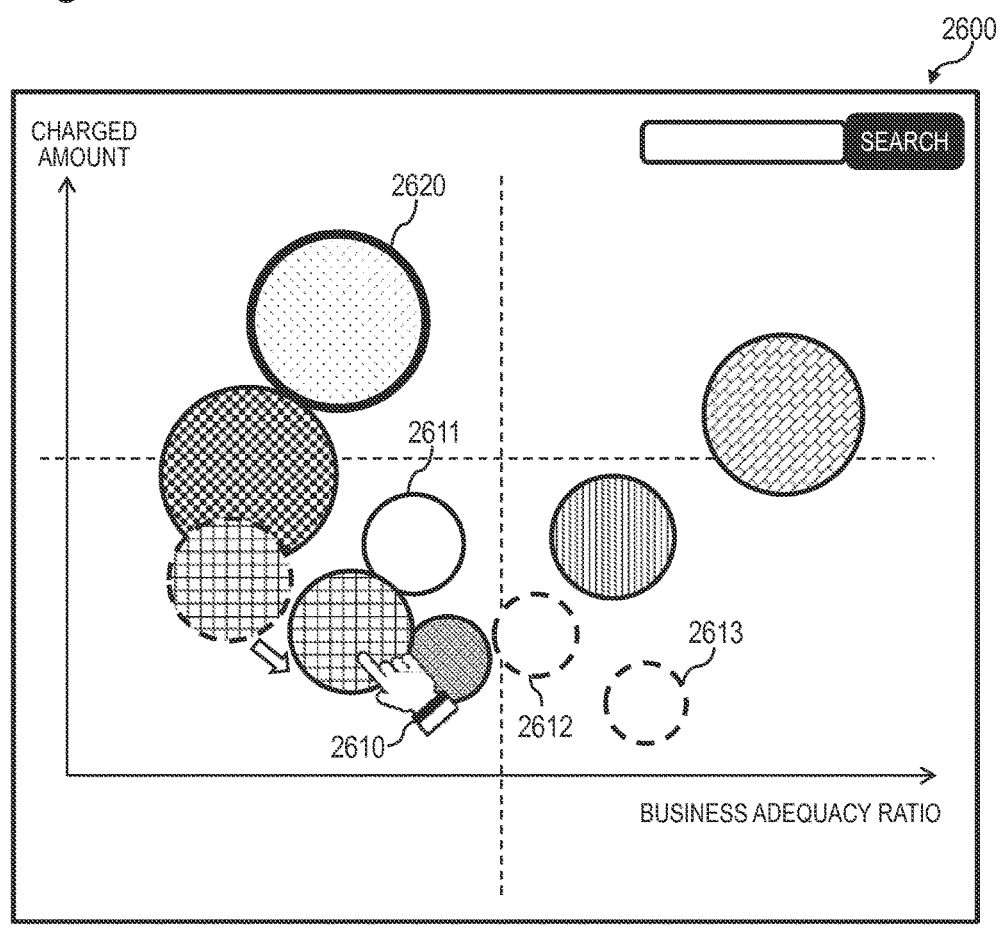
FIG. 28 is an explanatory diagram of how the amelioration plan displaying screen according to the first embodiment looks when a business system affected by an amelioration plan is highlighted.

Described next with reference to FIGS. 27 and 28 is affected business drawing processing for displaying a business system that is affected by an amelioration plan to be applied when the amelioration plan is selected on the amelioration plan displaying screen 2600 of FIG. 26.

FIG. 27 is a flow chart of the affected business drawing processing according to the first embodiment. The affected business drawing processing is executed by the amelioration effect determining part 106 when an input of manipulation in which a bubble of a business system is dragged on the amelioration plan displaying screen 2600 is received.

The amelioration effect determining part 106 first receives an input of manipulation in which a bubble of a business system is dragged by the administrator or others on the amelioration plan displaying screen 2600 (Step S1301).

The amelioration effect determining part 106 next obtains coordinates to which the bubble has been moved (travel destination coordinates) by the received dragging manipulation (Step S1302), and calculates, for each amelioration plan, a distance between a bubble of the amelioration plan and the travel destination coordinates obtained in Step S1302 (Step S1303). Coordinates at the center of a bubble of an amelioration plan, for example, can be used as the coordinates of the bubble of the amelioration plan.

The amelioration effect determining part 106 next determines, as an amelioration plan to be applied, an amelioration plan that is shortest in the distance calculated in Step S1303 (Step S1304), and obtains, from a record of the amelioration plan information 119 of FIG. 13 where identification information of this amelioration plan is registered as the amelioration plan ID 1301, a business system ID registered as the affected business ID 1309 (Step S1305).

The amelioration effect determining part 106 next determines whether or not at least one business system ID has been obtained in Step S1305 (Step S1306).

When it is determined in Step S1306 that no business system ID has been obtained, the amelioration effect determining part 106 ends the processing.

When it is determined in Step S1306 that at least one business system ID has been obtained, the amelioration effect determining part 106 selects a business system ID that is a processing target from the business system IDs obtained in Step S1305 (Step S1307), and highlights a displayed bubble of a business system that is associated with the processing target business system ID as a business system affected by the amelioration plan (affected business system) (Step S1308).

Steps S1307 and S1308 are executed repeatedly until executing Step S1308 is finished for every business system ID obtained in Step S1305. When executing Step S1308 is finished for every business system ID obtained in Step S1305, the processing is ended.

FIG. 28 is an explanatory diagram of how the amelioration plan displaying screen 2600 according to the first embodiment looks when a business system affected by an amelioration plan is highlighted.

A bubble of a business system selected by the administrator or others is moved by dragging manipulation on the amelioration plan displaying screen 2600 of FIG. 26. In FIG. 28, the administrator or others move the bubble of the business system to the lower right so that the bubble of the business system approaches an amelioration plan bubble 2611.

Receiving this dragging manipulation, the amelioration effect determining part 106 executes the affected business drawing processing of FIG. 27. In the affected business drawing processing, an amelioration plan that is at the closest distance from the travel destination coordinates in Step S1304 is an amelioration plan that is represented by the amelioration plan bubble 2611 in FIG. 28. A business system affected by this amelioration plan is a business system that is represented by a bubble 2620 in FIG. 28, and the bubble 2620 is highlighted. The highlighting may be achieved by, for example, displaying the business system bubble 2620 in a blinking manner, or displaying the business system bubble 2620 in a color darker than the drawing colors of other bubbles.

This enables the operator or others to grasp which business system is affected by applying an amelioration plan, and accordingly facilitates the selection of an amelioration plan.

Second Embodiment

A second embodiment of this invention is described below with reference to FIGS. 29 and 30.

Figure 30:
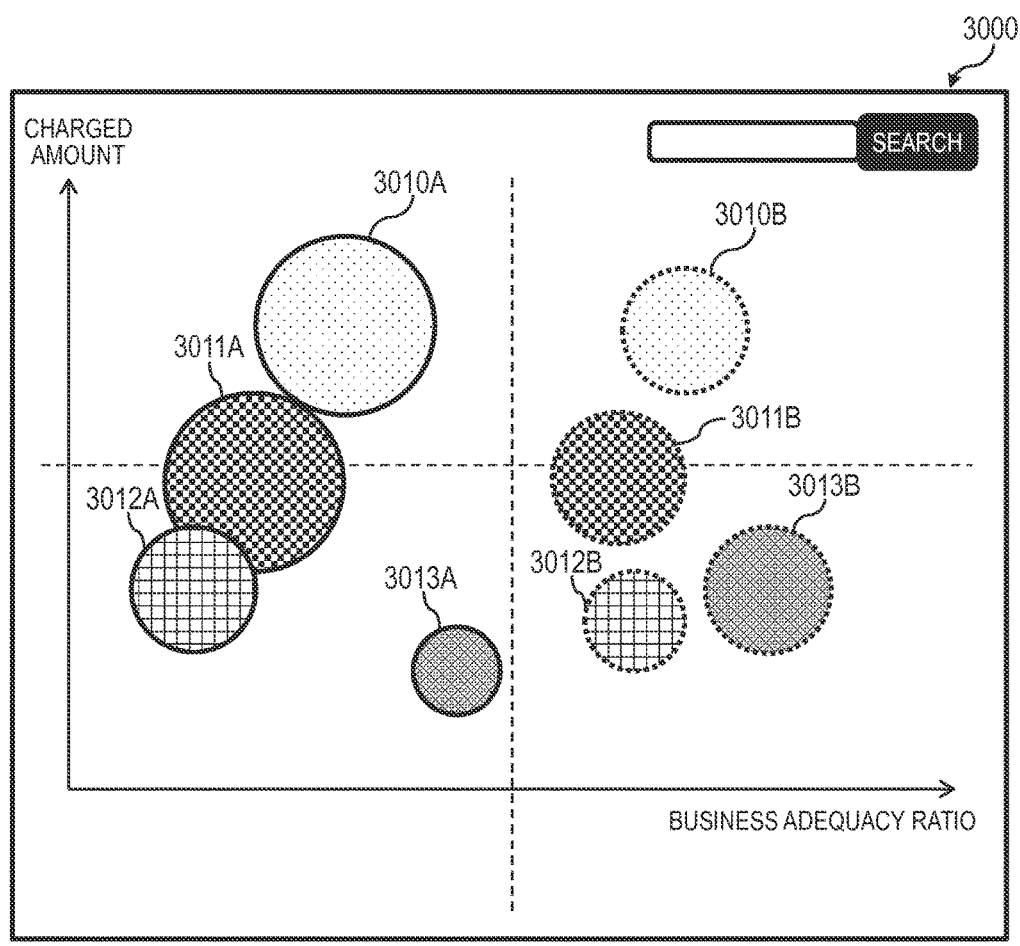
FIG. 30 is an explanatory diagram of an ideal operation displaying screen according to the second embodiment.

The management computer 1 according to the second embodiment displays an ideal operation displaying screen 3000 illustrated in FIG. 30 which shows the best amelioration plan for each business system whose operation situation is displayed on the operation situation displaying screen 2000 of FIG. 20 when an input of an amelioration plan drawing command is received on the operation situation displaying screen 2000.

Figure 29:
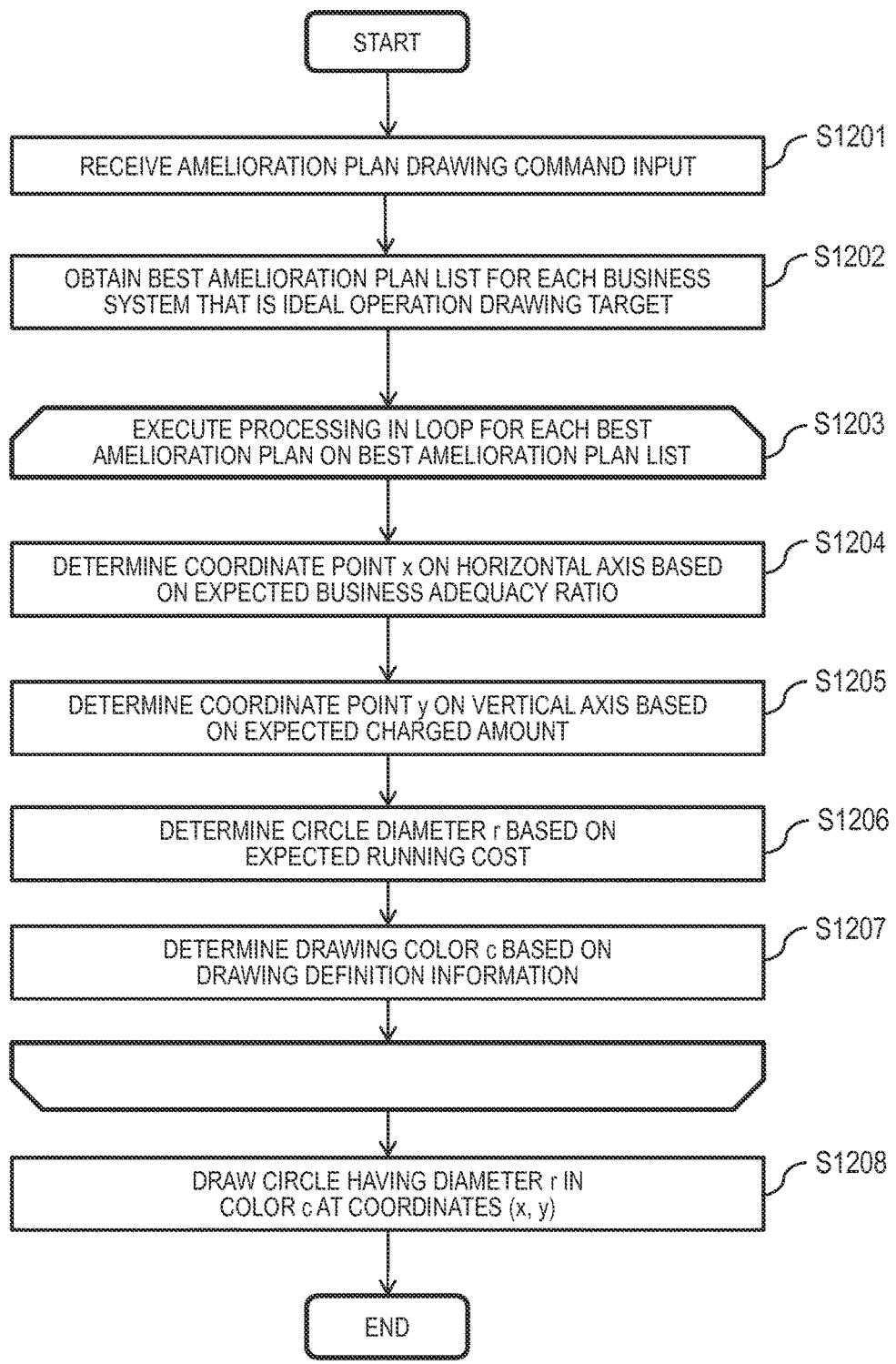
FIG. 29 is a flow chart of ideal operation drawing processing according to a second embodiment.

FIG. 29 is a flow chart of ideal operation drawing processing according to the second embodiment. The ideal operation drawing processing is executed by the amelioration plan drawing part 107.

The amelioration plan drawing part 107 first receives an input of an amelioration plan drawing command from the administrator or others (Step S1201). The amelioration plan drawing part 107 receives an input of an amelioration plan drawing command when, for example, a "display ideal operation" button (not shown) is displayed on the operation situation displaying screen 2000 and is manipulated.

The amelioration plan drawing part 107 next refers to the amelioration plan information 119 of FIG. 13 to obtain the best amelioration plan for each business system that is an ideal operation drawing target (Step S1202). The amelioration plan drawing part 107 refers to the business operation situation information 115 of FIG. 12 to identify, as an ideal operation drawing target business system, a business system for which a business adequacy ratio registered as the business adequacy ratio 1202 is equal to or less than a threshold. The amelioration plan drawing part 107 then refers to the amelioration plan information 119 of each ideal operation drawing target business system to obtain for each ideal operation drawing target business system an amelioration plan in which an expected business adequacy ratio registered as the expected business adequacy ratio 1303 is lowest. An amelioration plan in which the expected business adequacy ratio is lowest is an amelioration plan in which the deviation of the expected utilization ratio of a resource from the adequate utilization ratio of the resource is lowest.

The amelioration plan drawing part 107 next selects one best amelioration plan that is a processing target from the best amelioration plans obtained in Step S1202, and executes Steps S1204 to S1207 for the selected one best amelioration plan (Step S1203). In the case where it is found in Step S1203 that executing Steps S1204 to S1207 has been finished for every best amelioration plan obtained in Step S1202, the amelioration plan drawing part 107 proceeds to Step S1208.

The amelioration plan drawing part 107 first obtains, from a record of the amelioration plan information 119 where best amelioration plan identification information (a best amelioration plan ID) of the processing target best amelioration plan is registered as the amelioration plan ID 1301, an expected business adequacy ratio registered as the expected business adequacy ratio 1303, and determines the coordinate point x on the horizontal axis based on the obtained expected business adequacy ratio (Step S1204).

The amelioration plan drawing part 107 next obtains, from a record of the amelioration plan information 119 where the best amelioration plan ID of the processing target best amelioration plan is registered as the amelioration plan ID 1301, an expected charged amount registered as the expected charged amount 1307, and determines the coordinate point y on the vertical axis based on the obtained expected charged amount (Step S1205).

The amelioration plan drawing part 107 next obtains, from a record of the amelioration plan information 119 where the best amelioration plan ID of the processing target best amelioration plan is registered as the amelioration plan ID 1301, an expected running cost registered as the expected running cost 1308, and determines a circle diameter r based on the obtained expected running cost (Step S1206). As in Step S606 of the business operation situation drawing processing which is illustrated in FIG. 19, the amelioration plan drawing part 107 may determine a maximum circle diameter value in advance and determine the circle diameter r so that the maximum value is not exceeded.

The amelioration plan drawing part 107 next obtains the drawing rule of the processing target best amelioration plan from the drawing definition information 120 of FIG. 14, and determines the drawing color c based on the obtained drawing rule (Step S1207). The amelioration plan drawing part 107 may decide on a color that is the same as, or similar to, the drawing color of a bubble of the business system as the drawing color of a bubble of the best amelioration plan. This way, the administrator or others can clearly understand the relation between a business system and its best amelioration plan.

When executing Steps S1204 to S1207 is finished for every best amelioration plan obtained in Step S1202 and determining coordinate points on the horizontal axis and the vertical axis, the circle diameter, and the drawing color is finished for every best amelioration plan of the business system input in Step S1201, the amelioration plan drawing part 107 draws the ideal operation displaying screen 3000 illustrated in FIG. 30 that displays a circle having the diameter r at the coordinate points (x, y) on the horizontal axis and the vertical axis in the drawing color c (Step S1208), and ends the processing. If a circle with a small diameter is drawn so as to be hidden behind a circle with a large diameter on the ideal operation displaying screen 3000, the administrator or others may fail to notice the small-diameter circle. The amelioration plan drawing part 107 may therefore draw the ideal operation displaying screen 3000 in a manner that puts a circle having a larger diameter r at the back with respect to the respective circles. The amelioration plan drawing part 107 may display a circle representing the best amelioration plan on the ideal operation displaying screen 3000 immediately after executing Step S1207.

FIG. 30 is an explanatory diagram of the ideal operation displaying screen 3000 according to the second embodiment.

In FIG. 30, the operation situations of the respective business systems are displayed as bubbles 3010A to 3013A, and the best amelioration plans of the respective business systems are displayed as bubbles 3010B to 3013B. The best amelioration plan for a business system that is associated with the bubble 3010A is the bubble 3010B. The best amelioration plan for a business system that is associated with the bubble 3011A is the bubble 3011B. The best amelioration plan for a business system that is associated with the bubble 3012A is the bubble 3012B. The best amelioration plan for a business system that is associated with the bubble 3013A is the bubble 3013B. In FIG. 30, a bubble of the best amelioration plan for a business system is displayed with the same pattern as that of a bubble that indicates the operation situation of the business system. This enables the administrator or others to clearly understand the relation between a business system and its best amelioration plan.

The best amelioration plan for a business system that is in operation is displayed in the manner described above, and the administrator or others can thus grasp the limits of amelioration of the respective business systems.

Third Embodiment

The third embodiment is described below with reference to FIGS. 31 and 32. This embodiment describes the system configurations of virtual machine templates and how to generate the business adequacy ratio definition information 111 of FIG. 4.

In this embodiment, the adequacy ratio calculating program 131, which is illustrated in FIG. 2, executes adequacy ratio calculating processing in which a system configuration is determined for a virtual machine template and adequacy ratios of respective resources in the system configuration are registered in the business adequacy ratio definition information 111 as the adequacy ratios of the respective resources of the virtual machine template.

Figure 31:
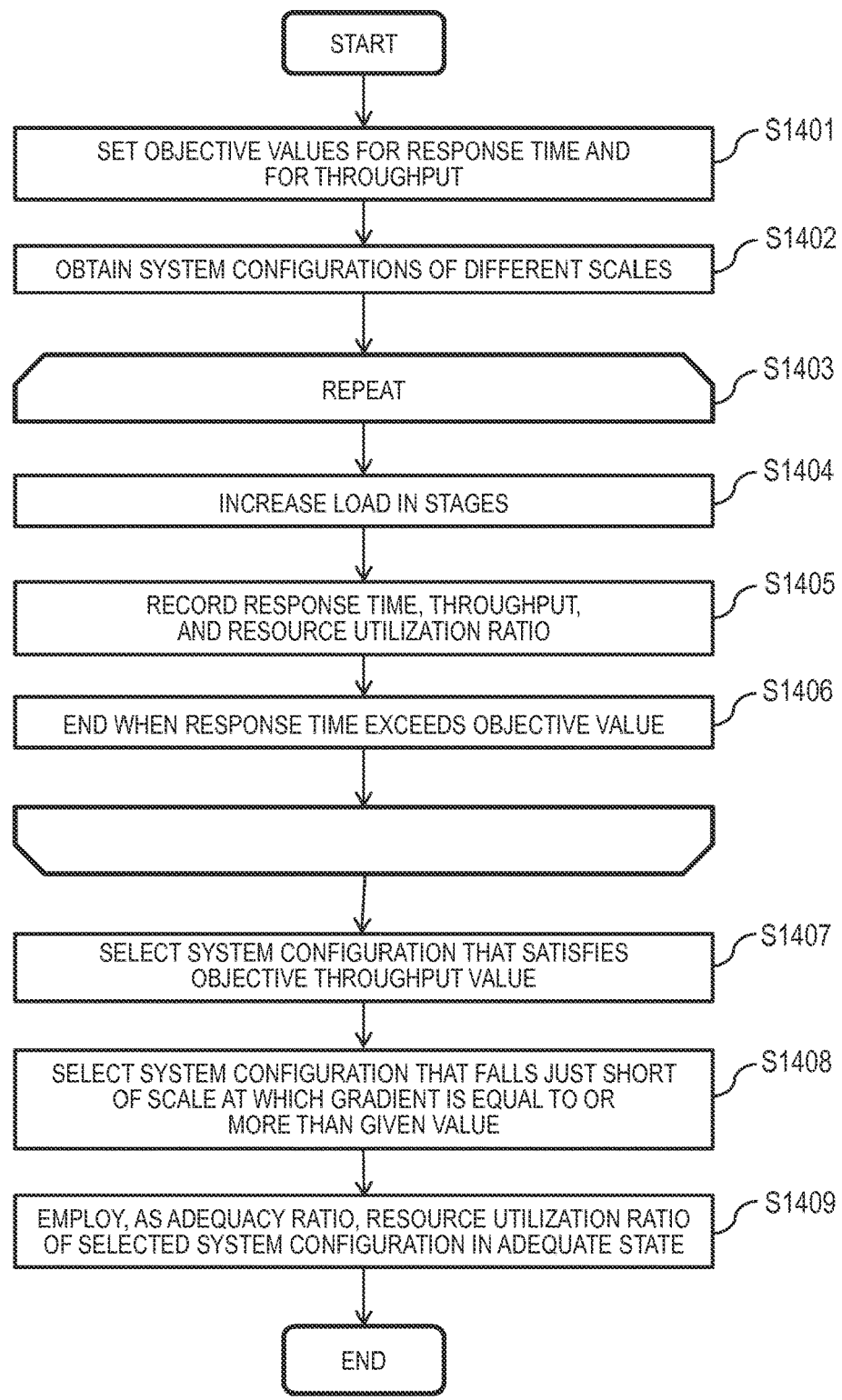
FIG. 31 is a flow chart of adequacy ratio calculating processing according to a third embodiment.

FIG. 31 is a flow chart of the adequacy ratio calculating processing according to the third embodiment. The adequacy ratio calculating processing is executed by the adequacy ratio calculating program 131 of FIG. 2.

The adequacy ratio calculating program 131 first sets an objective value for response time and an objective value for throughput (Step S1401). For example, the adequacy ratio calculating program 131 sets values input by the administrator or others as these objective values.

The adequacy ratio calculating program 131 next obtains system configurations of a processing target virtual machine template that have different scales (Step S1402). For example, the system configurations may be input by the administrator or others.

The adequacy ratio calculating program 131 next selects one system configuration that is a processing target from the system configurations obtained in Step S1402, and executes Steps S1404 to S1406 (Step S1403). After executing Steps S1404 to S1406 is finished for every system configuration obtained in Step S1402, the adequacy ratio calculating program 131 proceeds to Step S1407.

The adequacy ratio calculating program 131 first increases, in stages, load applied to the processing target system configuration (Step S1404), and stores a throughput, a response time, and resource utilization ratios (e.g., a CPU utilization ratio, a memory utilization ratio, a disk input/output (I/O) utilization ratio, a network I/O utilization ratio, and the like) at each load (Step S1405). The adequacy ratio calculating program 131 then registers, in the adequacy ratio calculation source information 130 shown in FIG. 32, a throughput, a response time, and utilization ratios of the respective resources that are observed at the time when response time reaches the objective value set in Step S1401 or higher (S1406), and returns to Step S1403.

The adequacy ratio calculation source information 130 is described with reference to FIG. 32. FIG. 32 is an explanatory diagram of the adequacy ratio calculation source information 130 according to the third embodiment. Registered in the adequacy ratio calculation source information 130 are a throughput and the utilization ratios of respective resources that are observed at the time when response time reaches an objective value in a system configuration that is a candidate for application to a virtual machine template.

The adequacy ratio calculation source information 130 includes a system configuration 3201, a maximum throughput 3202, a response time 3203, a CPU utilization ratio 3204, a memory utilization ratio 3205, a disk I/O utilization ratio 3206, and a network I/O utilization ratio 3207.

For each system configuration that is a candidate for application to a virtual machine template, identification information by which the system configuration can be identified is registered as the system configuration 3201. A throughput that is observed when response time reaches an objective value is registered as the maximum throughput 3202. The response time that has reached the objective value is registered as the response time 3202. A CPU utilization ratio that is observed when response time reaches the objective value is registered as the CPU utilization ratio 3204. A memory utilization ratio that is observed when response time reaches the objective value is registered as the memory utilization ratio 3205. A disk I/O utilization ratio that is observed when response time reaches the objective value is registered as the disk I/O utilization ratio 3206. A network I/O utilization ratio that is observed when response time reaches the objective value is registered as the network I/O utilization ratio 3207.

Returning to FIG. 31, the adequacy ratio calculating processing is described. When executing Steps S1404 to S1406 is finished for every system configuration, the adequacy ratio calculating program 131 refers to the adequacy ratio calculation source information 130 of FIG. 32 to select any system configuration for which a throughput registered as the maximum throughput 3202 is equal to or less than the objective throughput value set in Step S1401 (Step S1407).

The adequacy ratio calculating program 131 next selects, as a system configuration to be applied to the processing target virtual machine template, a system configuration that falls just short of a scale at which the gradient is equal to or less than a given value in a graph that has the scales of the system configurations selected in Step S1407 as the x-axis and the maximum throughputs of the respective system configurations as the y-axis (Step S1408). Normally, the maximum throughput which indicates the rate of performance amelioration is larger when the system configuration scale is greater. The maximum throughput, however, stops growing after the system configuration reaches a certain scale or more, and then performance amelioration by expanding the system configuration scale cannot be expected. In Step S1408, a scale just short of one at which performance amelioration is no longer expected is selected. This way, a system configuration that falls just short of a system configuration scale at which the scalability reaches the limit is selected and an optimum system configuration from the viewpoint of system configuration and performance amelioration can be selected.

The adequacy ratio calculating program 131 then registers resource utilization ratios of the system configuration selected in Step S1408 in the business adequacy ratio definition information 111 of FIG. 4 (Step S1409), and ends the processing.

Instead of executing Step S1408, the adequacy ratio calculating program 131 may select, as a system configuration to be applied to the processing target virtual machine template, a system configuration whose scale is the smallest of the system configurations selected in Step S1407.

An adequacy ratio suitable for the system configuration of a virtual machine template can thus be defined.

This invention is not limited to the embodiments described above, and encompasses various modification examples. For instance, the embodiments given above are detailed descriptions that are written for easy understanding of this invention, and this invention is not necessarily limited to a mode that includes all the components described above. Replacing some components of one embodiment with components of another embodiment is also an option. Components of one embodiment may be added with components of another embodiment. For some components in each embodiment, other components may be added or deleted or may substitute.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the above-mentioned functions. Programs, tables, files, and other types of information for implementing the above-mentioned functions can be put in a memory, a recording device such as a hard disk or a solid state drive (SSD), or a recording medium such as an IC card, an SD card, or a DVD.

The control lines and information lines given above are ones deemed as necessary to describe this invention, and not all of control lines and information lines of a product are necessarily given above. It may be considered that almost all components are connected to one another in actuality.

What is claimed is:

1. A management computer for improving operation of a private cloud computing system, the management computer comprising:
    a communication interface that is communicatively coupled to a plurality of servers that each operate a plurality of virtual machines via a network;
    a memory;
    a display; and
    a processor communicatively coupled to the communication interface, the memory and the display, wherein the processor:
    determines, using the communication interface, utilization information for each of the plurality of virtual machines, wherein the utilization information includes a processor utilization, memory utilization and a disk utilization,
    retrieves adequacy ratio definition information from the memory,
    calculates, for each of the plurality of virtual machines, adequacy deviation degrees based on the utilization information and the adequacy ratio definition information,
    calculates, for each respective server from the plurality of servers, a business adequacy ratio based on the adequacy deviation degrees calculated for the plurality of virtual machines operated by the respective server,
    retrieves, from the memory, configuration information for each of the plurality of machines operated by each of the plurality of servers,
    calculates, for each respective server from the plurality of servers, a charge amount based on the configuration information for the plurality of virtual machines operated by the respective server, determines, for each of the plurality of servers, a size and location of a respective bubble based on the charge amount and the business adequacy ratio, displays, using the display, the respective bubble of each of the plurality of servers on a bubble chart that plots business adequacies ratios along a first axis and charged amounts along a second axis, receives a selection of a particular bubble that is displayed for a particular server, retrieves, from the memory, amelioration candidate templates for the particular server, calculates, for each of the amelioration candidate templates, an expected business adequacy ratio and an expected charge for the particular server, determines, for each of the amelioration candidate templates, a size and location of an amelioration bubble based on the expected charge and the expected business adequacy ratio, and displays, using the display, the amelioration bubble for each of the amelioration candidate templates on the bubble chart.

2. The management computer according to claim 1, wherein, in a case where the adequacy deviation degrees calculated indicates that a resource utilization ratio is below an adequate utilization ratio, the processor refers to a system template information stored in the memory to identify, as an amelioration plan, a business system configuration that is smaller in allocated resource capacity than the configuration of the business system that is in operation.

3. The management computer according to claim 1, wherein the processor further:

identifies, as a best amelioration plan, an amelioration plan in which the expected business adequacy ratio indicates that the adequacy deviation degrees from an adequate utilization ratio is smallest out of amelioration plans for a particular server whose operation situation is displayed by the operation situation displaying part; and displays in the bubble chart the expected business adequacy ratio, the expected charge, and the expected running cost of the best amelioration plan.

4. The management computer according to claim 2, wherein the processor calculates the adequate utilization ratio based on, a response time of the respective server, and the resource utilization ratio in the respective server.

5. A method for improving operation of a private cloud computing system, the method comprising:

determining utilization information for each of a plurality of virtual machines, wherein the utilization information includes a processor utilization, memory utilization and a disk utilization;

retrieving adequacy ratio definition information from a memory;

calculating, for each of the plurality of virtual machines, adequacy deviation degrees based on the utilization information and the adequacy ratio definition information;

calculating, for each respective server from a plurality of servers that operates the plurality of virtual machines, a business adequacy ratio based on the adequacy deviation degrees calculated for the plurality of virtual machines operated by the respective server;

retrieving, from the memory, configuration information for each of the plurality of machines operated by each of the plurality of servers;

calculating, for each respective server from the plurality of servers, a charge amount based on the configuration information for the plurality of virtual machines operated by the respective server;

determining, for each of the plurality of servers, a size and location of a respective bubble based on the charge amount and the business adequacy ratio;

displays, using a display, the respective bubble of each of the plurality of servers on a bubble chart that plots business adequacies ratios along a first axis and charged amounts along a second axis;

receiving, via an input, a selection of a particular bubble that is displayed for a particular server;

retrieving, from the memory, amelioration candidate templates for the particular server;

calculating, for each of the amelioration candidate templates, an expected business adequacy ratio and an expected charge for the particular server;

determining, for each of the amelioration candidate templates, a size and location of an amelioration bubble based on the expected charge and the expected business adequacy ratio; and displaying, using the display, the amelioration bubble for each of the amelioration candidate templates on the bubble chart.

6. A computer-readable non-transitory storage medium having stored thereon a program that when executed by a management computer cause a processor of the management computer to execute the method of claim 5.

* * * * *